United States Patent
Milchtaich

(10) Patent No.: US 11,991,181 B2
(45) Date of Patent: May 21, 2024

(54) MULTI FACTOR AUTHENTICATION

(71) Applicant: CORONET CYBER SECURITY LTD., Tel-Aviv (IL)

(72) Inventor: Doron Milchtaich, Rehovot (IL)

(73) Assignee: CORONET CYBER SECURITY LTD., Tel-Aviv (IL)

( * ) Notice: Subject to any disclaimer, the term of this patent is extended or adjusted under 35 U.S.C. 154(b) by 281 days.

(21) Appl. No.: 17/596,344

(22) PCT Filed: Jul. 31, 2019

(86) PCT No.: PCT/IB2019/056529
§ 371 (c)(1),
(2) Date: Dec. 8, 2021

(87) PCT Pub. No.: WO2021/019285
PCT Pub. Date: Feb. 4, 2021

(65) Prior Publication Data
US 2022/0224692 A1    Jul. 14, 2022

(51) Int. Cl.
*H04L 9/40* (2022.01)
(52) U.S. Cl.
CPC ........ *H04L 63/102* (2013.01); *H04L 63/0861* (2013.01); *H04L 63/105* (2013.01); *H04L 2463/082* (2013.01)
(58) Field of Classification Search
CPC ....... H04L 63/10; H04L 63/102; H04L 63/12; H04L 63/105; H04L 63/0861; H04L 2463/082
See application file for complete search history.

(56) References Cited

U.S. PATENT DOCUMENTS

| | | | |
|---|---|---|---|
| 9,419,968 B1 | 8/2016 | Pei et al. | |
| 10,225,243 B2 * | 3/2019 | Murthy | H04L 63/102 |
| 10,523,708 B1 * | 12/2019 | Ilincic | H04M 3/5175 |
| 10,547,600 B2 * | 1/2020 | Murthy | H04L 63/0236 |

(Continued)

FOREIGN PATENT DOCUMENTS

WO    2019/048915 A1    3/2019

OTHER PUBLICATIONS

International Search Report issued in PCT/IB2019/056529 dated Dec. 20, 2019 (2 pages).

(Continued)

*Primary Examiner* — Hosuk Song
(74) *Attorney, Agent, or Firm* — Acuity Law Group, PC; Michael A. Whittaker

(57) ABSTRACT

A method of multi-factor authentication, the method comprising computer executed steps, the steps comprising: from a computer of a cloud service, receiving data identifying a user logged-in to the cloud service after being successfully authenticated using a first authentication factor, communicating with a client device of the logged-in user, for receiving a second authentication factor from the logged-in user, determining whether the second authentication factor received from the logged-in user is valid, based on a result of the determining, determining a first user-permission policy for the logged-in user, and communicating the determined first user-permission policy to the computer of the cloud service, for the cloud service to base a restriction of usage of the cloud service by the logged-in user on.

22 Claims, 7 Drawing Sheets

(56) References Cited

U.S. PATENT DOCUMENTS

| | | | |
|---|---|---|---|
| 10,599,824 B2* | 3/2020 | Scopis | H04L 63/0861 |
| 11,038,873 B2* | 6/2021 | Burch | H04W 12/06 |
| 11,528,265 B2* | 12/2022 | Jasleen | H04L 63/0823 |
| 2016/0087957 A1* | 3/2016 | Shah | H04L 63/205 |
| | | | 726/1 |
| 2020/0304542 A1* | 9/2020 | Ilincic | H04L 63/0853 |

OTHER PUBLICATIONS

Written Opinion issued in PCT/IB2019/056529 dated Dec. 20, 2019 (10 pages).

* cited by examiner

MULTI FACTOR AUTHENTICATION

CROSS-REFERENCE TO RELATED APPLICATIONS

The present invention is filed under 35 U.S.C. § 371 as the U.S. national phase of International Application No. PCT/IB2019/056529, filed Jul. 31, 2019, which designated the United States. The entire disclosures of the above-identified priority application is hereby fully incorporated herein by reference.

FIELD AND BACKGROUND OF THE INVENTION

The present invention relates to user authentication, and more specifically but not exclusively to a system and method of multi-factor authentication of users of cloud services.

In recent years, organizational information technology (IT) is moving away from internal, relatively fixed computing environments to more dynamic, external, cloud based computing environments.

Historically, organization's computing resources existed mainly on fixed infrastructure owned by the organization and controlled directly by the organization.

However, with the extensive virtualization of computing resources, and the widespread use of shared computing environments typically implemented as web-accessed cloud services, a growing part of modern organization's computing resources may reside on or use a variety of cloud services.

Indeed, in recent years, many organizations have outsourced significant parts of their IT resources to cloud services, and have thus become dependent on a growing numbers of cloud services such as MS Office365™, Google G-Suite™, Dropbox™, Amazon Web Service™ (AWS), etc.

On the one hand, cloud computing has allowed enterprises to avoid, minimize or postpone many IT infrastructure costs, has allowed enterprises to get their applications up and running faster with improved manageability, and with less maintenance, and has enabled IT teams to more rapidly adjust resources to meet an often fluctuating demand.

On the other hand, the storage of sensitive information systems on external cloud services rather than on the organization's internal network has exposed organizations to extensive data security threats.

Specifically, in recent years, identity theft and password hacking have become very popular tools among cyber criminals, and as a result, personal and company data protected by credentials have become much more vulnerable.

Indeed, hackers and other criminals have developed numerous identity theft methods, such as the hacking of computer networks, the use of inside access and abusing rights of privileged IT users, to steal authorized users' usernames and passwords, or the use of guesswork to compromise weak passwords through brute-through attacks.

The more cloud services an organization uses, the more opportunities a cyber criminal has, for accessing sensitive data that belong to the organization or the organization's employees, on one of the growing number of cloud services used by organizations nowadays.

The growing number of cloud services used by a nowadays organization, also adds to the organization's system administrators and other IT team member's tasks. For example, the IT team member may need to dedicate more and more of his time (and other resources), to tasks of defining and implementing a specific data security function for each and every specific one of the cloud services used by the organization.

SUMMARY OF THE INVENTION

According to one aspect of the present invention, there is provided a method of multi-factor authentication, the method comprising computer executed steps, the steps comprising: from a computer of a cloud service, receiving data identifying a user logged-in to the cloud service after being successfully authenticated using a first authentication factor, communicating with a client device of the logged-in user, for receiving a second authentication factor from the logged-in user, determining whether the second authentication factor received from the logged-in user is valid, based on a result of the determining, determining a first user-permission policy for the logged-in user, and communicating the determined first user-permission policy to the computer of the cloud service, for the cloud service to base a restriction of usage of the cloud service by the logged-in user on.

According to a second aspect of the present invention, there is provided a method of multi-factor authentication, the method comprising computer executed steps, the steps comprising: authenticating a user attempting to log in to a cloud service, using a first authentication factor, allowing the authenticated user to log in to the cloud service, communicating data identifying the logged-in user to a computer of an authentication service, receiving a first user-permission policy determined by the authentication service for the logged-in user based on a result of an attempt to authenticate the logged-in user using a second authentication factor, from the computer of the authentication service, and restricting usage of the cloud service by the logged-in user based on the received first user-permission policy.

According to a third aspect of the present invention, there is provided a non-transitory computer readable medium storing computer processor executable instructions for performing steps of multi-factor authentication by a computer, the steps comprising: from a computer of a cloud service, receiving data identifying a user logged-in to the cloud service after being successfully authenticated using a first authentication factor, communicating with a client device of the logged-in user, for receiving a second authentication factor from the logged-in user, determining whether the second authentication factor received from the logged-in user is valid, based on a result of the determining, determining a first user-permission policy for the logged-in user, and communicating the determined first user-permission policy to the computer of the cloud service, for the cloud service to base a restriction of usage of the cloud service by the logged-in user on.

According to a fourth aspect of the present invention, there is provided a non-transitory computer readable medium storing computer processor executable instructions for performing steps of multi-factor authentication by a computer, the steps comprising: authenticating a user attempting to log in to a cloud service, using a first authentication factor, allowing the authenticated user to log in to the cloud service, communicating data identifying the logged-in user to a computer of an authentication service, receiving a first user-permission policy determined by the authentication service for the logged-in user based on a result of an attempt to authenticate the logged-in user using a second authentication factor, from the computer of the authentication service, and restricting usage of the cloud service by the logged-in user based on the received first user-permission policy.

According to a fifth aspect of the present invention, there is provided a system for multi-factor authentication, the system comprising a circuit comprising a computer processor and a computer memory storing instructions that are executable by the computer processor, for performing steps of multi-factor authentication, the steps comprising: from a computer of a cloud service, receiving data identifying a user logged-in to the cloud service after being successfully authenticated using a first authentication factor, communicating with a client device of the logged-in user, for receiving a second authentication factor from the logged-in user, determining whether the second authentication factor received from the logged-in user is valid, based on a result of the determining, determining a first user-permission policy for the logged-in user, and communicating the determined first user-permission policy to the computer of the cloud service, for the cloud service to base a restriction of usage of the cloud service by the logged-in user on.

According to a sixth aspect of the present invention, there is provided a system for multi-factor authentication, the system comprising a circuit comprising a computer processor and a computer memory storing instructions that are executable by the computer processor, for performing steps of multi-factor authentication, the steps comprising: authenticating a user attempting to log in to a cloud service, using a first authentication factor, allowing the authenticated user to log-in to the cloud service, communicating data identifying the logged-in user to a computer of an authentication service, receiving a first user-permission policy determined by the authentication service for the logged-in user based on a result of an attempt to authenticate the logged-in user using a second authentication factor, from the computer of the authentication service, and restricting usage of the cloud service by the logged-in user based on the received first user-permission policy.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof.

Moreover, according to actual instrumentation and equipment of preferred embodiments of the method and system of the present invention, several selected steps could be implemented by hardware or by software on any operating system of any firmware or a combination thereof.

For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. The description taken with the drawings making apparent to those skilled in the art how the several forms of the invention may be embodied in practice.

In the drawings.

DESCRIPTION OF THE PREFERRED EMBODIMENTS

Figure 1:
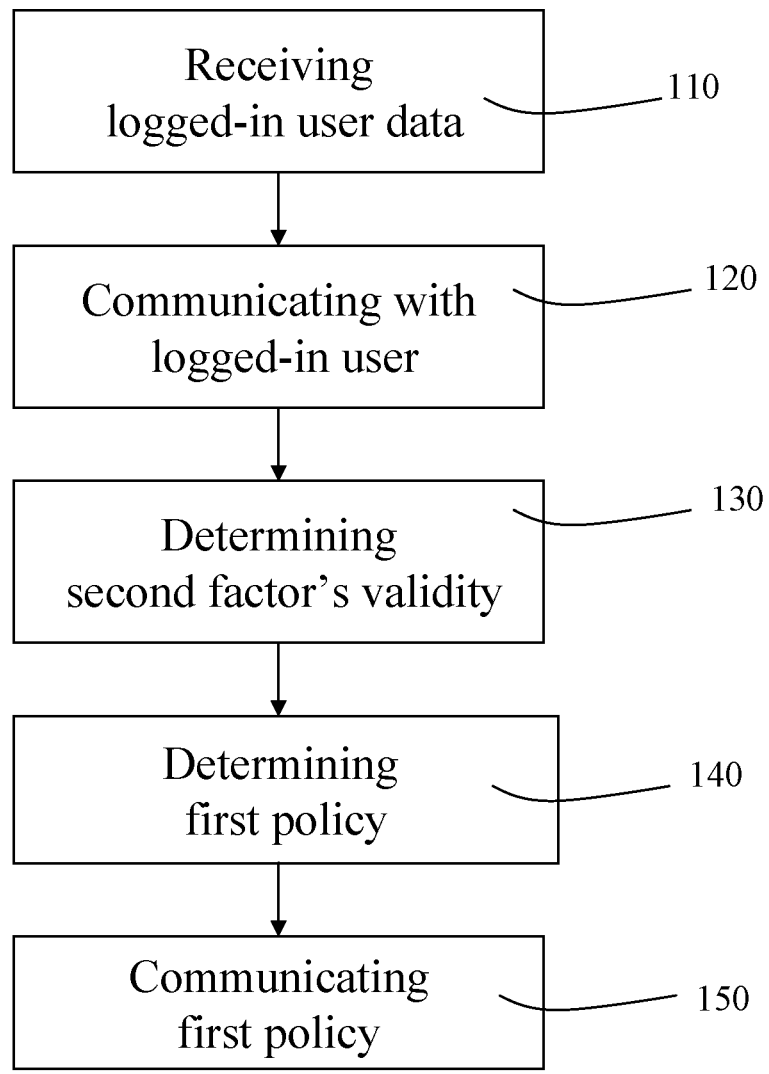
FIG. 1 is a flowchart illustrating a first exemplary method of multi-factor authentication, according to an exemplary embodiment of the present invention.

The present embodiments comprise a system and method of multi-factor authentication.

As explained hereinabove, with the extensive virtualization of computing resources, and the widespread use of information technology services shared as web-accessed cloud services, a growing number of a modern organization's computing resources may reside on or use a variety of computer cloud services.

On the one hand, cloud computing has allowed enterprises to avoid, minimize or postpone many IT infrastructure costs, allowed enterprises to get their applications up and running faster with improved manageability and less maintenance, and enabled IT teams to more rapidly adjust resources to meet fluctuating demand.

However, on the other hand, the storage of sensitive data and information systems on external cloud services rather than on the organization's own internal network has exposed organizations to more data security threats.

This is partially because the more cloud services an organization uses, the more opportunities a cyber criminal has, for accessing sensitive data that belong to the organization or to the organization's employees, on one of the growing number of cloud services used by the organization.

Indeed, as identity theft and password hacking becomes more and more popular among cyber criminals, personal and company data protected by the credentials becomes more and more vulnerable.

One tool more and more organizations adopt, to deal with identity theft and password hacking, is MFA (Multi Factor Authentication).

Usually, with MFA, not only does a user need to prove "something he knows" (usually his username and password), but the user is also required to prove possession of "something he owns" (say of his mobile phone), "something he is" (say using fingerprints, face recognition and/or other forms of biometry), etc.

Indeed, some of the many currently used public cloud services (such as MS Office365™, Google G-Suite™, Dropbox™, Amazon Web Service™ (AWS), etc.) have MFA functions offered to their client organizations, as known in the art.

An exemplary service-based MFA function implemented by a cloud service may include the following sequence of steps:

1. The user tries to access the cloud service using his web browser or native application, as known in the art.

2. The user is asked to provide his username and password to the cloud service, thus providing a first authentication factor to the cloud service.

3. If the password is successfully validated, the user is required to provide one or more additional authentication factors to the cloud service.

The additional authentication factor(s) may be provided by the user, by entering a code sent by SMS to the user's mobile phone on a webpage of the cloud service, by scanning his fingerprint, etc., as known in the art.

4. Once the additional authentication factor(s) is (are) also validated, the user is allowed to log in to the cloud service.

However, if an organization uses multiple cloud services, the organization's IT workers have to define an MFA function for each and every one of the cloud services that the organization makes available to the organization's employees, which may prove time consuming and costly.

Later, if a user who is an employee of the organization, needs to use two or more of multiple cloud services used by the organization, the user has to go through the sequence of steps 1-4 above, separately for each and every one of the cloud services that the user needs to use.

Some organizations also use an IdP (Identity Provider) service such as DUO™ or OneLogin™, to provide MFA authentication functions for cloud services in use by the organization.

Such an IdP-based MFA function implemented by a cloud service may include the following sequence of steps:

1. A user tries to access a first cloud service used by the user's organization, using a web browser or a native application installed on the user's computer, smart phone, or other device.

2. The user is redirected by the first cloud service, to authenticate with an IdP service, say by redirecting the user's browser to a webpage of the IdP service, as known in the art.

3. The user is required to provide his username and password to the IdP service, thus providing a first authentication factor.

4. If the password is successfully validated the user is required to provide one or more additional authentication factor to the IdP service.

5. Once the additional authentication factor(s) is (are) also validated, the IdP service sends an access token to the device used by the user to access the first cloud service, and redirects the user (say the user's browser), back to the first cloud service, as known in the art.

6. The user's device provides the access token to the first cloud service.

Optionally, the first cloud service validates the user-provided access token with the IdP service.

7. The user is allowed to log in to the first cloud service.

8. The user tries to access a second cloud service used by the user's organization.

9. The user is redirected by the second cloud service, to authenticate with the IdP service, say by redirecting the user's browser to a webpage of the IdP service, as described in further detail hereinabove.

10. The user is required to provide his username and password to the IdP service, thus providing a first authentication factor.

11. The IdP service recognizes the user as a one already authenticated a few minutes earlier, sends a second access token to user's device, and redirects the user (say the user's browser), back to the second cloud service.

12. The user's device provides the second access token to the second cloud service. Optionally, the second cloud service validates the user-provided access token with the IdP service.

13. The user is allowed to log in to the second cloud service.

Both currently-used IdP-based MFA functions and currently-used service-based MFA functions block a cloud service's user from logging-in into a cloud service until the user is authenticated using all authentication factors required by the user's organization—i.e. an all-or-nothing approach.

According to an exemplary embodiment of the present invention, there is rather implemented a multi-phased multi-factor process of authenticating a user who wishes to login to and use a cloud service (say a remote IT service such as MS Office365™, Google G-Suite™, Dropbox™, Amazon Web Service™ (AWS), etc.).

In the exemplary embodiment, the user is authenticated using a second authentication factor while the user is already logged into the cloud service and can use the cloud service, at least partially, as described in further detail hereinbelow.

In the multi-phase process, in each one of two or more authentication phases, the cloud service's usage by the user (say the data that the user is allowed to access or the actions that the user is allowed to perform) is limited according to a different user-permission policy, as described in further detail hereinbelow.

According to an exemplary embodiment, the user-permission policy for each phase of the process is selected for the user by an authentication service, as described in further detail hereinbelow.

Optionally, the authentication service is implemented by a party other than the user, the user's organization (say employer), and the cloud service, and is implemented on one or more computers remote from the user and from the cloud service's computers. Thus, the computer(s) that the authentication service is implemented on, may communicate remotely with the cloud service, the user, the user's organization, etc., as described in further detail hereinbelow.

Optionally, the authentication service is rather implemented by the user's organization, say on one or more of the organization' server computers that are accessed remotely by the cloud service and by the user, etc., as described in further detail hereinbelow.

In a first phase of the process, rather than blocking the user from logging-in to the cloud service until the user is authenticated using all authentication factors required by the user's organization, the user is allowed to log-in to the cloud service using at least one first authentication factor (say a username, a password, or both).

That is to say that in the first phase, the user is allowed to log in to the cloud service using one or more of the user's authentication factors (also referred hereinbelow as the first authentication factor), but the user need not provide all of his authentication factors yet.

Thus, in one example, per a requirement set by a user's employer, the user has to be authenticated using a password, a fingerprint, and possession of a specific security dongle. However, in the first phase, the user has to be authentication using the password and fingerprint only, in order to log in to the cloud service.

However, during that first phase of authentication, the user's actions on the cloud service are limited according to a first authentication policy, say a policy determined by the authentication service and communicated to the cloud service using an API (Application Programming Interface), as described in further detail hereinbelow.

In a first exemplary method of multi-factor authentication, according to an exemplary embodiment, the authentication service receives from the cloud service, data that identifies a user logged-in to a cloud service after being successfully authenticated by the cloud service using a first authentication factor.

In one example, the data that identifies the user successfully authenticated and logged-in to the cloud service, is generated by an API (Application Programming Interface) that is exposed by the cloud service and that is used by the authentication service to detect the user's logged-in event, as described in further detail hereinbelow.

While the user is still logged into the service (i.e. after the user has been successfully authenticated using the first authentication factor and allowed to log in to the cloud service), the authentication service communicates with a device of the logged-in user, for receiving a second authentication factor from the logged-in user.

Optionally, the user's device that the authentication service communicates with is not a device used by the user to access the cloud service or provide the first authentication factor with, but rather, a device (say a smart phone) identified as belonging to the user. Optionally, the user's organization records data that lists the specific user's devices on the authentication service's computer in advance of the communication between the user and the authentication service, say when signing up to the authentication service, as described in further detail hereinbelow.

Optionally, the authentication service communicates with the user's client device for receiving the second authentication factor from the logged-in user, without redirecting the user's device used to access the cloud service from a webpage of the cloud service to a webpage operated by the authorization service. Accordingly, in some examples, the user need not use the device used by the user to access the cloud service, to interact with the authentication service on a webpage of the authentication service.

Optionally, the second authentication factor is of a type that is different from the first authentication's type, say a one with which the user proves a possession of something (say of the user's cellular phone), a one based a biometric measurement of the user (say a scan of the user's fingerprint or face, etc.).

Thus, in a first example, the user logs in to a cloud service using the user's laptop computer, by providing a first authentication factor (say the user's username and password) that is then, verified by the cloud service.

In the first example, a few seconds later, the user's log-in event is detected by the authentication service using an API executed on the cloud service, and the authentication service sends an SMS message to the user's cellular phone (say a "Logged in to Dropbox?" text message). In the example, the user is expected to reply by sending a reply SMS message to the authentication service.

In the first example, by replying positively (say with a "Yes" text message), the user proves his possession of the cellular phone, and is thus authenticated using a second authentication factor. More specifically, in the first example, the authentication service authenticates the user, by verifying that a positive reply of the user is received in an SMS message sent from the user's cellular number as recorded in a database of the authentication service, as described in further detail hereinbelow.

In a second example, the authentication service communicates with a client application installed on the user's client device, say with a client application provided to the user's client device in advance (say a one downloaded from the authentication service's webpage), for receiving the second authentication factor from the user.

In the second example, the "Logged in to Dropbox?" text message of the first example is rather communicated to the client application, and the user has to reply positively (say with a "Yes" text message), say using a GUI (Graphical User Interface) of the client application, thereby proving his possession of the cellular phone, and being authenticated using a second authentication factor.

In other examples, the authentication service may authenticate the user using a different second authentication factor, say using an OTP (One-Time-Password) code generated by the client application installed on the user's smart phone and sent by the client application to the authentication service, by a code generated by an OTP security dongle when connected to the user's phone, through face recognition, etc., as described in further detail hereinbelow.

Thus, in some examples, unlike the IdP services described hereinabove, the authentication service of the present embodiments, may communicate with the user in a way that does not involve web interaction between the authentication service and the user's device used to access the cloud service. Unlike many other methods, in the example, the way does not require redirection of the user's device used to access the cloud service to a webpage of the authentication service, while the user is still active on the cloud service.

After receiving the second authentication factor, the authentication service determines whether the second authentication factor received from the logged-in user is indeed, valid.

The authentication service may determine the validity or lack of validity of the second authentication factor, according to one or more criterions.

The criterions may include, but are not limited to: a comparison of the received second authentication factor to reference values stored on a database of the authentication service, a time limit (say according to how long it takes for the user provide the authentication factor), a comparison of biometric templates extracted from the user's fingerprint, etc., as described in further detail hereinbelow.

Based on a result of that determining, the authentication service determines a first user-permission policy for the logged-in user. The determination of the first user-permission policy may be further based on data on the user, on data on the user's device, on data on the cloud service, on data on the type of authentication factor used as a second authentication factor, etc., as described in further detail hereinbelow.

In one example, the authorization service selects the first user-permission policy among two or more policies that are predefined on the authentication service in advance of the user's logging in to the cloud service. The policies may be defined, for example, by a programmer or operator of the authentication service, by an IT worker of the user's organization, etc., as described in further detail hereinbelow.

In the example, a first one of the predefined policies pertains to a case in which the second authentication factor is determined to be valid, and a second one of the predetermined policies pertains to a case in which the second authentication factor is not determined to be valid.

Next, the authentication service communicates the first user-permission policy to the cloud service, for the cloud service to base a restriction of the cloud service's usage by the logged-in user on, say using an API that effects a change in the user's authorizations on the cloud service, as described in further detail hereinbelow.

Optionally, data on a later event predefined, say by programmer or operator of the authentication service, which event occurs after the first user-permission policy is communicated to the cloud service, may be received by the authentication service, as described in further detail hereinbelow.

The later event may include, but is not limited to, a repeated attempt of the user to access data of an organization other than the user's organization, a repeated failure of the user to input certain data within a time limit predefined, say by a programmer of the cloud service, etc., as described in further detail hereinbelow.

Upon receiving the data on the later event, the authentication service communicates again with the logged-in user, for receiving a third authentication factor from the logged-in user, say a one different from both the first and second authentication factors, as described in further detail hereinbelow.

Then, the authentication service determines if the third authentication factor is valid, determines a second user-permission policy for the logged-in user, and communicates the determined second user-permission policy to the cloud service, for the cloud service to use, as described in further detail hereinbelow.

Optionally and similarly, later on, the authentication service may determine a third, fourth, or higher, user permission policy for the logged-in user, say upon receipt of data on occurrence of certain events, as may be predefined by a programmer or operator of the authentication service, as described in further detail hereinbelow.

Thus, with an exemplary embodiment, the user is authenticated in a multi-phase process, using a second (and potentially, subsequent) authentication factor(s), and the usage of a cloud service by the user in each one of two or more phases of the process, may be limited according to a different user-permission policy.

Optionally, the user-permission policy for each phase is determined according to validity or lack of validity of a respective, different authentication factor, as described in further detail hereinbelow.

The principles and operation of a method and a system of multi-factor authentication according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings.

The invention is capable of other embodiments or of being practiced or carried out in various ways. Also, it is to be understood that the phraseology and terminology employed herein is for the purpose of description and should not be regarded as limiting.

Reference is now made to FIG. 1, which is a flowchart illustrating a first exemplary method of multi-factor authentication, according to an exemplary embodiment of the present invention.

The first exemplary method of multi-factor authentication is carried out for implementing an authentication service on one or more computers, say using system 5000, as described in further detail hereinbelow.

The cloud service implemented by the steps of the first exemplary method performs a multi-phased multi-factor process of authenticating a user who wishes to login to, and use a cloud service, as described in further detail hereinbelow.

The cloud service may include, but is not limited to, a shared IT service such as MS Office 365™, Dropbox™, etc., or another IT resource that is available to users on demand, say via the internet or another network, and that is shared by a cloud computing provider among the provider's client organizations, as known in the art.

Thus, every day, such a cloud service usually serves users of several organizations that access the cloud service over the internet or over another wide area network.

The cloud service may additionally or alternatively, include a specific organization's own database, information system or software development tool, etc., or any combination thereof, as described in further detail hereinabove.

Although the authentication service too may be shared among two or more organizations, the cloud service mentioned hereinbelow and the authentication service mentioned hereinbelow, are not the same service.

In a first example, the authentication service is implemented by a party other than the user, the user's organization (say employer), and the cloud service, for providing the user's organization with an outsourced service of authenticating the organization's users when using a cloud service.

In the first example, the authentication service is implemented on one or more computers of the party that implements the authentication service, say on the system 5000 described in further detail hereinbelow and illustrated using FIG. 5.

For implementing the authentication service, the party's computer(s) may remotely communicate with the cloud service, the user, the user's organization, with a CASB (Cloud Access Security Broker) service that monitors communication between the user and the cloud service, etc., as described in further detail and hereinbelow.

Optionally, the authentication service uses different communication networks in parallel, or in partial parallel. For example, the authentication server may communicate with a cloud service over the internet, while communicating with a user of the cloud service over a cellular telephony network, as described in further detail and hereinbelow.

In the first example above, the authentication service offers user authentication as a service for two or more client organizations, with respect to one or more different cloud services, each of which cloud services provides users (say employees) of one or more of the organizations with access to one or more shared computing resources.

The shared computing resource(s) that the cloud service provides users of the client organizations with access to, may include, but are not limited, to data storage, web hosting, ERP (Enterprise Resources Planning) systems, AI (Artificial Intelligence) software and hardware, or any another IT resource, as known in the art.

In a second example, the authentication service is rather implemented by the user's organization. For example, the authentication service may be implemented on one or more of the organization's own server computers.

In the second example, for implementing the authentication service, the organization's server computer(s) remotely communicate(s) with the cloud service, the user, a CASB service that monitors communication between the user and the cloud service, etc., as described in further detail hereinbelow.

The first exemplary method includes steps that at least one computer processor that is a part of a circuit (i.e. hardware and associated circuitry) of a computer that the authentication service is implemented by, is programmed to perform, as described in further detail hereinbelow.

The computer that implements the authentication service may actually include one or more computers, as described in further detail hereinbelow. Thus, the steps of the first exemplary method may be performed on one or more computer processor(s), as described in further detail hereinbelow.

In the method, there is received 110 from a computer of a cloud service, data that identifies a user logged-in to a cloud service, after the user is successfully authenticated using a first authentication factor. Optionally, the data is received 110 by the data receiver 510 of the first exemplary system 5000, as described in further detail and illustrated using FIG. 5, hereinbelow.

In one example, the data that identifies the user successfully authenticated and logged-in to the cloud service, is generated by an API (Application Programming Interface) that is exposed by the cloud service, as known in the art. The API is thus used by the authentication service to detect the user's logged-in event, and to receive 110 the data that identifies the logged-in user from the cloud service, as described in further detail hereinbelow.

The example's API includes a subroutine used by the authentication service to retrieve 110 data on any user that when the API is run, is logged-in to the cloud service, provided that the user belongs to an organization signed up to the authentication service or is a worker of the authentication service.

Thus, in one example, the API includes a subroutine the queries one or more tables of active users of the cloud service (say system tables of a database of the cloud service, as known in the art), and their organizational data, to retrieve usernames or other data that identify users successfully authenticated and logged-in.

The query used by the API that queries the active users table(s) may be defined in advance, for example, by a computer programmer of the authentication service, when using the API in computer code used by the programmer to implement the authentication service.

In a second example, the API rather queries a log of the cloud service for log-in events that are predefined by a programmer of the authentication service, when using the API in computer code used to implement the authentication service.

Optionally, the API subroutine is run automatically, say every two minutes, by the authentication service (say through remote access to the cloud service) or rather by the cloud service itself, say using scheduling software, as known in the art.

Alternatively, when a user logs in to the cloud service, the cloud service forwards login data on the user (say a username, organization, login time, IP Address, etc.), to the authentication service. The login data of the example make up at least a part of the data on the logged-in user that is received 110 by the authentication service, as described in further detail hereinbelow.

Optionally, for logging in to the cloud service, the user has to be successfully authenticated by the cloud service, using a first authentication factor (say a username and a password or an IP Address), as described in further detail hereinabove. Alternatively or additionally, the user's authentication using the first authentication factor is rather carried out by the authentication service, as described in further detail hereinabove.

Optionally, after receiving 110 the data that identifies the logged-in user, the authentication service (say one of the computers that implement the authentication service) retrieves the user's details (say a phone number or email address) from a database of the authentication service.

The user's details may be input to the authentication's database in advance of receipt 110 of the data, say by an IT worker of the user's organization when setting up an account with the authentication service, say using a GUI (Graphical User Interface), as described in further detail hereinbelow.

Optionally, using the user details, the authentication service, say the authentication factor communicator 520 of system 5000, communicates 120 with a client device in use by the logged-in user, for receiving 120 a second authentication factor from the logged-in user, as described in further detail hereinbelow.

The authentication service communicates 120 with the client device while the user is already logged into the service (say after the user is successfully authenticated using the first authentication factor and is allowed to access the cloud service) and can use the cloud service, at least partially, as described in further detail hereinbelow.

In one example, the specific user's device that the authentication service communicates with, is not a device (say computer) in use by the user for accessing the cloud service or for providing the first authentication factor, but rather, another device (say a smart phone or another computer) identified as belonging to the user.

Thus, in the example, rather than interrupting the user's actions performed on the cloud service using a first client device, the authentication service communicates with a second client device that is known to belong to the user, for receiving the second authentication factor from the user, as described in further detail hereinbelow.

In one example, an IT worker of the user's organization records data that lists the specific user's client devices in a database of the authentication service, in advance of communication 120 between the user and the authentication service, say when setting up an account for the user, on the authentication service.

Optionally, the authentication service communicates 120 with the user's client device (say the example's smart phone)—whether used for accessing the cloud service or not—for receiving the second authentication factor from the logged-in user, without redirecting the user from a website used by the user to access the cloud service.

In one example, the authentication service communicates 120 with the user without redirecting a browser used by the user on his laptop computer (say from the cloud service's webpage to the authorization service's webpage) or requiring the user to interact with the authentication service on the authentication service's webpage.

Optionally, the second authentication factor is of a type that is different from the first authentication's type. The second authentication factor may be, for example, a factor with which the user proves the user's possession of something (say of the user's smart phone), a factor based a biometric measurement of the user (say a scan of the user's fingerprint or face), etc., as known in the art.

Thus, in a first example, the user logs in to a cloud service using the user's laptop computer, by providing a first authentication factor (say the user's username, password, or both) that is verified by the cloud service, and used by the cloud service as a basis for allowing the user to log in to the cloud service.

In the first example, a few seconds later, the user's log-in event is detected 110 by the authentication service using an API executed on the cloud service, the authentication service thereby receiving 110 the data that identifies the user logged-in to the cloud service after being successfully authenticated using the first factor.

In the first example, the authentication service authenticates the logged-in user while the user is active on the cloud service, using a second authentication factor with which the user proves that the user possess a client device recorded on a database of the authentication service, as a client device that belongs to the user.

For example, an organization may record phone numbers of the organization's employees in a database of the authentication service, to be used by the authentication service for verifying possession of a cellular phone that has that phone number, by a user, as described in further detail hereinbelow.

Thus, in the example, after receipt 110 of the data, the authentication service retrieves the user's cellular phone number from the database, and communicates 120 with the user's cellular phone, for receiving 120 the second authentication factor from the logged-in user, as described in further detail hereinbelow.

Optionally, in the first example, the authentication service's computer communicates 120 with the user logged-in to the cloud service with the user's laptop computer, by sending 120 an SMS message to the user's cellular phone's number (say a "Logged in to Dropbox?" text message), as described in further detail hereinbelow.

Alternatively, in the first example, the authentication service's computer communicates 120 with the user logged-in to the cloud service with the user's laptop computer, by sending 120 a textual message to a client application installed on the user's cellular phone (say a "Logged in to Dropbox?" message), as described in further detail hereinabove.

In other examples, the authentication service authenticates the user using a different second authentication factor, say using an OTP (One-Time-Password) key generated by a client application installed on the user's cellular phone or by an OTP security dongle when connected by the user to the user's computer, using face recognition, using a fingerprint scan, etc., as described in further detail hereinbelow.

Thus, in some examples, unlike the IdP services described hereinabove, the authentication service communicates 120 with the user in a way that does not involve web interaction and that does not require redirection of the user to a webpage of the authentication service, while the logged-in user can still act on the cloud service.

After receiving 120 the second authentication factor, the authentication service, say the validity determiner 530 of system 5000, determines 130 whether the second authentication factor received 120 from the logged-in user, is valid, as described in further detail hereinbelow.

The authentication service may determine 130 the validity or lack of validity of the second authentication factor according to one or more criterions, as described in further detail hereinbelow.

In the first example above, the user provides 120 the second authentication factor, simply by replying positively to the message (say the "Logged in to Dropbox?" message) sent 120 to the user's cellular phone (i.e. the phone number), as described in further detail hereinabove.

The user may reply positively to the message, say by sending an SMS message bearing the "Yes" text to the authentication service, by sending a textual message bearing the "Yes" text to the authentication service using a client application installed on the user's cellular phone, etc., as described in further detail hereinabove.

Thus, in the first example, the user may prove his possession of the cellular phone, merely by sending 120 the reply message from the user's cellular number as recorded in advanced on the authentication service's database, as described in further detail hereinbelow.

More specifically, in the first example, the authentication service may verify 130 that the cellular number that the user's reply message is received 120 from is indeed, the user's number recorded on the authentication service's database. If the number is indeed the user's number recorded on the authentication service's database, the authentication service determines 130 that the second authentication factor is valid, thus authenticating 130 the logged-in user using a second authentication factor.

The criterions used by the authentication service for determining 130 whether the second authentication factor received 120 from the user is valid, may additionally or alternatively, include one or more other criterions.

The other criterions may include, but are not limited to:
- a comparison of the received second authentication factor with a reference value (say an answer to a security question such as the user's birth date, school name, or model of a car owned by the user, a PIN (Personal Identification Number)) stored on a database of the authentication service, etc.).
- a time limit (say a one that dictates that the user has to provide a valid secondary authentication factor by no later than five minutes from the sending of the SMS or other textual message to the user's phone number as recorded on the authentication factor's database).
- a comparison of biometric templates extracted from the user's fingerprint, face, or retina, to a template received earlier from the user or the user's organization etc., as described in further detail hereinbelow.

Then, based on a result of the determining 130 of the second authentication factor's validity or lack of validity, there is determined 140 a first user-permission policy for the logged-in user, say by the policy determiner 540 of system 5000, as described in further detail and illustrated using FIG. 5, hereinbelow.

Optionally, the first user-permission policy is determined 140 according to data on the user, data on the user's client device, data on the cloud service, data on the type of the authentication factor used as a second authentication factor, etc., or any combination thereof, as described in further detail hereinbelow.

Optionally, the determining 140 of the first user-permission policy is carried out by selecting 140 the user-authentication policy among two or more policies that are pre-defined and recorded in one of the authentication service's databases in advance of the user's logging in to the cloud service, as described in further detail hereinbelow.

Optionally, the policies recorded on the authentication service are defined and recorded on the authentication service' database in advance of any authentication of a user who is an employee of the organization by the authentication service.

Optionally, the policies are defined by a programmer or operator of the authentication service, by an IT worker of the user's organization, etc., say using a GUI implemented on a website of the authentication service, as described in further detail hereinbelow.

In a first example, one or more of the policies is defined by a programmer of the authentication service, say as a set of parameters input to an API subroutine or otherwise embedded in the subroutine's computer code. In the first example, when executed on the cloud service, the API effects a change in the user's authorizations on the cloud service, as described in further detail hereinbelow.

In a second example, one or more of the policies are defined and recorded on a database of the authentication service, say by an IT worker of the user's organization, as described in further detail hereinbelow. When received by the cloud service, say in a file sent 150 to the computer of the cloud service over a wide area network such as the internet, the received data is used by the cloud service as a basis for changing the user's authorizations, as described in further detail hereinbelow.

In one example, a first one of two or more of the predefined policies pertains to a case in which the second authentication factor is determined 130 to be valid, whereas a second one of the two or more predetermined policies pertains to a case in which the second authentication factor is not determined 130 to be valid.

Specifically, in the example, the first predefined policy is selected 140 for the logged-in user, if the user-provided 120 second authentication factor is determined 130 to be valid. More specifically, in the example, the second authentication factor is determined 130 to be valid if the user's "Yes" message is received 120 within five minutes of the sending of the "Logged in to Dropbox?" message to the user, as described in further detail hereinabove.

In the example, the first predefined policy allows the logged-in user to read, update and delete any data stored by the user's organization on the cloud service (i.e. any data stored on the cloud service by the user or by another user that belongs to the user's organization).

Further in the example, if the user's "Yes" message is not received 120 within five minutes of the sending of the "Logged in to Dropbox?" message to the user, the second authentication factor is not determined 130 to be valid. Consequently, there is selected 140 the second predefined policy for the logged-in user.

In one example, the second predefined policy limits the user's activities to reading data records created by the user himself only. In a second example, the second predefined policy blocks the logged-in user from acting on the cloud service and disconnects the logged-in user from the cloud service.

Next in the method, the first user-permission policy is communicated 150 to a computer of the cloud service, say by the policy communicator 550 of system 5000, for the cloud service to base a restriction of the usage of the cloud service by the logged-in user on, as described in further detail hereinbelow.

In one example, the first user-permission policy is communicated 150 to the cloud service's computer, using an API (application programming interface) that effects a change in the user's authorizations on the cloud service and/or disconnects the user from the cloud service.

Optionally, for effecting the change, a subroutine of the API is input one or more parameters or the API is added specific pieces of computer code that are embedded in the API's code, say by a computer programmer, as described in further detail hereinbelow.

Thus, in one example, the communicating 150 of the determined 140 first user-permission policy comprises effecting a change in authorizations of the logged-in user in the cloud service, using an API that is run on the computer of the cloud service, as described in further detail hereinbelow.

In a second example, the determined 140 user-permission policy is rather communicated 150 to the cloud service's computer as data that is stored in a file transmitted 150 to the cloud service's computer, say as an email attachment or using FTP (File Transfer Protocol), etc.

When the file is received by the cloud service, the data received 150 in the file, is used by the cloud service as a basis for changing the user's authorizations, say using a utility program run every two minutes on the cloud service's computer, say using scheduling software, as known in the art.

Optionally, later, data on occurrence of a later event (say an attempt of the user to access data of an organization other than the user's organization), which event occurs after the user's authentication using the second authentication factor, may be received by the authentication service.

In one example, the data on the later event is received using an API that periodically queries a log of the cloud service for one or more events that are predefined by a programmer of the authentication service, say when using the API in computer code used to implement the authentication service.

Upon receiving the data on the later event, the authentication service (say the data receiver 510) communicates again with the logged-in user's client device, this time for receiving a third authentication factor from the logged-in user, say in a way that is similar to the communication 120 described in further detail hereinabove.

Optionally, the third authentication factor is different from both the first and the second authentication factors received from the user.

Thus, in one example, the first authentication factor is the user's user name or password, the second factor is a proven possession of the user's cellular phone or other device, and the third factor is biometric—say a template extracted from scanning the user's fingerprint, retina, or face, as known in the art.

When in receipt of the third authentication factor, there is determined if the third authentication factor is valid, say in one or more of the ways used for determining 130 if the second authentication factor is valid, say by the validity determiner 530 of system 5000, as described in further detail hereinabove.

Then, there is determined a second user-permission policy for the logged-in user based on a result of the determining of the validity or lack of validity of the third authentication factor, say in one or more of the ways used for determining 140 the first user-permission policy, say by the policy determiner 540, as described in further detail hereinabove.

Next, the determined second user-permission policy is communicated to the computer of the cloud service, for the cloud service to base a restriction of the logged-in user's on the cloud service on, say in a way 150 similar to one or more of the ways described in further detail hereinabove, say by the policy communicator 550.

Optionally and similarly, later on, there may be determined a third, fourth, fifth, or higher, user permission policy for the logged-in user, say upon receipt of data on occurrence of certain events, as predefined by a user or operator of the authentication service. Optionally, the third, fourth, fifth or higher policy is determined based on different authentication factors, as described in further detail hereinbelow.

Thus, with some exemplary embodiments, the user is authenticated in a multi-phase process, such that in each phase, the user is authenticated using another authentication factor.

Thus, in one example, in a first phase, the user is authenticated using a second authentication factor, in a second phase, the user is authenticated using a third authentication factor, in a third phase, the user is authenticated using a fourth factor, etc., as described in further detail hereinbelow.

Optionally, in each one of two or more phases of the multi-phase process, the usage of a cloud service by the user is limited according to a different user-permission policy. In one example, the user-permission policy for each phase is determined according to validity or lack of validity of a respective, different authentication factor, as described in further detail hereinbelow.

Optionally, the first exemplary method further includes a preliminary step of communicating (say by the policy communicator 550) a preliminary user-permission policy to the cloud service's computer, for the cloud service to base a restriction of usage of the cloud service by the user on, before the user is authenticated using the first user-permission policy.

The preliminary user-permission policy may thus used by the authentication service as a basis for restricting the usage of the cloud service by the logged-in user on until the authentication service determines the first user-permission policy for the logged-in user, in a way similar to the ways described in further detail hereinabove.

Optionally, the preliminary user-permission policy is communicated to the cloud service using an API that effects a change in the user's authorizations on the cloud service, say using parameters input to the API by computer code that implements the authentication service, as described in further detail hereinbelow.

Optionally, the preliminary user-permission policy is rather communicated to one of the cloud service's computers as data that is stored in a file that is transmitted to the cloud service's computer, say as an email attachment or using FTP, as described in further detail hereinabove.

Thus, in a first example, in a step preceding the preliminary step described hereinabove, an IT worker of the user's organization defines a default, preliminary user-permission policy to be applied on any user that belongs to the organization. The preliminary user-permission policy may be, for example, a user-permission policy that restricts activities of any logged-in user not authenticated using a second authentication factor yet, to data reading only.

In the first example, the IT worker defines the policy using a GUI implemented on a webpage of the authentication service (say a GUI with multiple input fields, menus, and other elements, as known in the art).

In the first example, using the GUI, the IT worker further defines a list of cloud services that the preliminary user-permission policy is to be communicated to, as described in further detail hereinbelow.

Optionally, the preliminary user-permission policy is communicated to all cloud services included in the list defined by the organization's IT worker, periodically, say every day, every week, every two hours, etc., as defined by the IT worker, or rather by an operator or programmer of the authentication service.

Optionally, the preliminary user-permission policy is not communicated to the cloud services periodically, but is rather communicated to a cloud service after the user logs in to the cloud service successfully using a first authentication factor (say the user's username, password, or both).

Thus, in some examples, after receiving 110 the data that identifies the logged-in user, but prior to communicating 120 with the logged-in user for receiving the second authentication factor, the preliminary user-permission policy is communicated to the cloud service's computer, say by the policy communicator 550 of system 5000, as described in further detail hereinabove.

Consequently, the cloud service restricts usage of the cloud service by the logged-in user based on the preliminary authentication policy, before the cloud service receives the first user-permission policy from the authentication service, as described in further detail hereinbelow.

Optionally, using the authentication service, an organization can limit remote access of users to cloud services based on a criterion that is based on one or more parameters. The criterion is used for determining 140 the first user-permission policy, for determining the preliminary user-permission policy, etc., as described in further detail hereinbelow.

Accordingly, the exemplary method may further include receiving auxiliary data that is used together with data received 110 on the logged-in user authenticated using the first authentication factor, for determining 140 a user-permission policy, say by the policy determiner 540, as described in further detail hereinbelow.

Optionally, at least a part of the auxiliary data is received from the cloud service's computer, whether periodically— say every three hours, once a day, etc., or rather in real time or near real time—say a few seconds after the user logs in to the cloud service, say in the step of receiving 110 the data on the logged-in user.

Optionally, at least a part of the auxiliary data is received from the user's organization, say using a GUI implemented on a website that the authentication service uses for allowing IT workers of organizations that subscribe to the authentication service, to input the auxiliary data or a part thereof.

Optionally, at least a part of the auxiliary data is received from the user, say using a GUI implemented on a website that the authentication service uses for allowing users of organizations that subscribe to the authentication service, to input the auxiliary data or a part thereof.

Optionally, the first exemplary method further includes using at least a part of the auxiliary data for the determining 140 of the preliminary user-permission policy, the first user-permission policy, the second or higher user-permission policy, or any combination thereof, as described in further detail hereinbelow.

Optionally, the auxiliary data includes data on the user's client device (laptop, smart cellular phone, etc.) used to access the cloud service. The data on the client device that is used to access the cloud service may be received, for example, from the cloud service's computer or rather, from the user's organization, as described in further detail hereinbelow.

The data on the client device used to access the cloud service, may include, for example, an indication on the client device's type (say a laptop computer vs. a cellular phone), on the device's prior use by the user (say when logging in to the cloud service before), on the device's configuration, etc., as described in further detail hereinbelow.

The data on the device's configuration may include, for example, a list of applications installed on the client device, data on statuses of applications installed on the client device (say that a specific application used for encrypting files on the client device is stopped or removed), etc., as described in further detail hereinbelow.

The data on the client device used to access the cloud service may additionally or alternatively, include a security indication, say an indication that a certain anti-virus is installed on the client device or that the client device belongs to the user's organization (and is thus, presumably, more trustworthy than a private device), etc.

Optionally, the auxiliary data includes data on the logged-in user, say on the user's organizational role, department, current geographical location (say GPS location data), IP (Internet Protocol) Address, recent behavior (say an indication that the user attempts to access data that does not belong to the user's organization), etc.

Optionally, the auxiliary data includes data on a network (say the internet or a cellular network) used by the user for logging in to the cloud service, say an SSID (Service Set Identifier) of an access point (say of a Wi-Fi network) that the user uses to access the cloud service, a security method of the access point (say WEP, WPA2, WPA3, etc.), etc., as known in the art.

The data on the network may additionally or alternatively, include, data that lists one or more access points revealed in a scan carried out by the client device when communicating with the cloud service, data that marks one or more of the revealed access points as malicious, etc., as described in further detail hereinbelow.

Optionally, the auxiliary data includes data on the cloud service, say data that identifies the cloud service, data that identifies an owner or operator of the cloud service, etc., as described in further detail hereinbelow.

The data on the cloud service may additionally or alternatively include, status data (say that the service is under hackers attack or is slower than usual), configuration data (say on a vulnerable program used by the service), user-specific configuration data (say that a specific user connected to the service can access all documents on the service), etc., as described in further detail hereinbelow.

Optionally, at least a part of the auxiliary data is stored in a database that is also referred to hereinbelow as a context database.

Each one of context database's records holds a specific combination of the auxiliary data, say of specific user, device, network and service attributes, thus defining a specific circumstance under which the device, network and service is used by the specific user, as described in further detail hereinbelow.

Optionally, the first user-permission policy's determination 140, the preliminary user-permission policy's determination, a later user-permission policy's determination, or any combination thereof, is based, at least partially, on one or more of the context database's records, as described in further detail hereinbelow.

Optionally, in the first exemplary method, there is further received one or more rules from the user's organization, say from an IT worker of the user's organization when using a GUI to define one or more of the rules, as described in further detail hereinbelow.

The one or more rules are used for determining one or more of the user-permission policies, say for determining 140 the first user-permission or for determining the preliminary user-permission policy, say together with one or more of the records stored in the context database, as described in further detail hereinbelow.

Thus, in one example, when defining the preliminary user-permission policy, the first user-permission policy, or one of the other user-permission policies, an IT worker of an organization may be allowed to define a rule that dictates when the policy being defined is to be selected for a logged-in user. Then, the rule defined by the IT worker is saved in a database, on the authentication service's computer, as described in further detail hereinbelow.

In the example, the determining 140 of the first user-permission policy, the determining of the preliminary user-permission, the determining of the later user-permission policy, or any combination thereof, may additionally or alternatively, be based on one or more of the rules received from the organization, as described in further detail hereinbelow.

Figure 2:
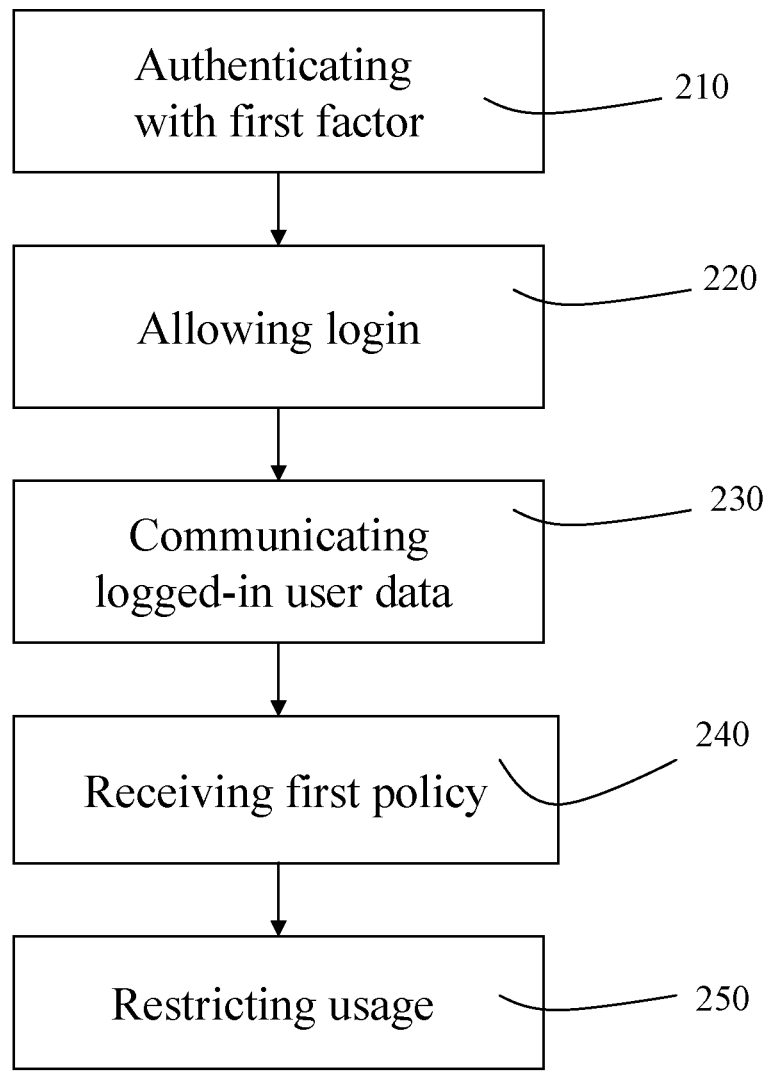
FIG. 2 is a flowchart illustrating a second exemplary method of multi-factor authentication, according to an exemplary embodiment of the present invention.

Reference is now made to FIG. 2, which is a flowchart illustrating a second exemplary method of multi-factor authentication, according to an exemplary embodiment of the present invention.

The second exemplary method of multi-factor authentication is carried out by a cloud service (i.e. by one or more computers that the cloud service is implemented by), for implementing a multi-phased multi-factor process of authenticating a user who wishes to login to, and use the cloud service. Optionally, the second exemplary method is carried out by system 6000, as described in further detail hereinbelow.

The cloud service may include, but is not limited, to a shared IT service such as MS Office365™, Dropbox™, or another IT resource that is made available to users on demand, say via the internet or via another network, and is shared among the cloud service provider's client organizations, as described in further detail hereinabove.

Thus, every day, such a cloud service usually serves users of several organizations that access the cloud service over the internet or over another wide area network.

The cloud service may additionally or alternatively, include a specific organization's own database, information system or software development tool, etc., or any combination thereof, as described in further detail hereinabove.

For carrying out the steps of the second exemplary method, the cloud service (i.e. the computer(s) that the cloud service is implemented on) communicates with a user of the cloud service and with an authentication service that the first exemplary method is carried out by, etc., as described in further detail hereinabove.

In a first example, the authentication service is implemented by a party other than the user, the user's organization (say employer) and the cloud service (whether the cloud service is operated by a party other than the user's organization or not).

In the first example, the authentication service is thus provided to the user's organization as an outsourced service of authenticating the organization's users when using the cloud service, and optionally, to one or more other organizations that are clients of the authentication service, as described in further detail hereinabove.

For each specific each one of the client organizations, the user authentication service provides the user authentication service with respect to one or more different cloud services. Each one of the cloud services provides users (say employees) of the specific organization with access to a respective, one or more shared computing resource, as described in further detail hereinabove.

In the example, the cloud service's computer(s) may remotely communicate with a client device used by the user for accessing the cloud service, with the authentication service's computer(s), with a CASB service that monitors communication between the user and the cloud service, etc., as described in further detail and hereinbelow.

In a second example, the authentication service is rather implemented by the user's organization itself. For example, the authentication service may be implemented on one or more of the organization's own server computers, as described in further detail hereinabove.

The second exemplary method includes steps that at least one computer processor that is a part of a circuit (i.e. hardware and associated circuitry) of a computer (say a computer of system 6000) that the cloud service is implemented by, is programmed to perform, as described in further detail hereinbelow.

The computer that performs the second exemplary method may actually include one or more computers, as described in further detail hereinbelow. Thus, the steps of the second exemplary method may be performed on one or more computer processor(s), say on system 6000, as described in further detail hereinbelow.

In the second exemplary method of multi-factor authentication, a user who wishes to access a cloud service, opens a webpage of the cloud service, as known in the art.

Then, the user attempts to log in to the cloud service using a first authentication factor, say by typing a username, a password, or both a username and a password, on the cloud service's webpage, as described in further detail hereinbelow.

Optionally, then, the cloud service (say the user authenticator 610 of system 6000) authenticates 210 the user that attempts to log in to the cloud service, using the first authentication factor, as described in further detail hereinbelow.

Alternatively, the cloud service rather forwards the user to the authentication service, for the authentication service to authenticate 210 the user using the first authentication factor as described in further detail hereinabove.

In a first example, the cloud service authenticates 210 the user by comparing the first authentication factor (say username, password, or both) to a reference value (say the user's username or password) provided earlier to a computer of the cloud service by the user himself or rather, by the user's organization, and stored in the cloud service's database.

If the first authentication factor provided by the user is found to be valid, the user thereby being successfully authenticated 210, the authenticated 210 user is allowed 220 to log-in to the cloud service, say by the login controller 620 of system 6000, as described in further detail hereinabove.

After the user is successfully authenticated 210 using the first authentication factor and is logged-in 220 to the cloud service, there is communicated 230 data that identifies the logged-in user to a computer of an authentication service, say by the user data communicator 630 of system 6000, as described in further detail hereinabove.

In one example, the data that identifies the user successfully authenticated 210 and logged-in 220 to the cloud service, is generated and communicated 230 to the cloud service using an API (Application Programming Interface) that is exposed by the cloud service, as described in further detail hereinabove.

The API (whether run by the cloud service or rather, by the authentication service) is thus used by the cloud service to detect the user's logged-in event, and send 230 the data that identifies the logged-in user from the cloud service's computer to the authentication service's computer, as described in further detail hereinabove.

The API of the example includes a subroutine that generates the data on the logged-in user, by retrieving data on any user that when the API is run, is logged-in to the cloud service, provided that the user belongs to an organization signed up to the authentication service or is the authentication service's worker.

Thus, in one example, the API includes a subroutine that generated the data by querying a database of active users of the cloud service and their organizational data (say one or more related tables of a database of the cloud service), to retrieve usernames or other data that identify users successfully authenticated and logged-in.

A query used by the API that queries the active users table(s) may be defined, for example, by a programmer of the authentication service or by a programmer of the cloud service, when using the API in computer code used to implement the cloud service, or rather to implement the authentication service.

In a second example, the API rather generates the data that identifies the user successfully authenticated 210 and logged-in 220 to the cloud service, by querying a log of the cloud service for log-in events, as predefined by a programmer of the authentication service or rather, of the cloud service, as described in further detail hereinabove.

In one example, the API that generates the data that identifies the user successfully authenticated 210 and logged-in 220 to the cloud service, is run automatically, say every two minutes, by the authentication service (say through remote access to the cloud service) or rather by the cloud service itself.

After receiving the data on the logged-in 220 user from the cloud service, the user authentication service attempts to authenticate the user, using a second authentication factor provided by the user to the authentication service, as described in further detail hereinabove.

Optionally, the second authentication factor is of a type that is different from the first authentication factor's type.

Thus, in one example, the first authentication factor provided by the user is a password, whereas the second authentication factor provided by the user is a factor with which the user proves his possession of something (say a smart phone), a factor based on a biometric measurement of the user (say a scan of the user's face), etc., as described in further detail hereinabove.

Based on a result of a determining of the second authentication factor's validity or lack of validity, the authentication service determines a first user-permission policy for the logged-in user, and communicates the first user-permission policy to the cloud service, as described in further detail hereinabove.

Optionally, the authentication service determines the first user-permission policy according to data on the user, data on the user's device, data on the cloud service, data on the type of authentication factor used as a second authentication factor, etc., or any combination thereof, as described in further detail hereinbelow.

Next, the first user-permission policy is received 240 by the cloud service, say by the policy receiver 640 of system 6000, as described in further detail hereinbelow.

Next, the cloud service's usage is restricted 250 based on the received 240 first user-permission policy, say by the usage restrictor 650 of system 6000, as described in further detail hereinbelow.

In one example, the first user-permission policy is received 240 by the cloud service (say by the policy receiver 640 of system 6000), using an API that effects a change in the user's authorizations on the cloud service and/or disconnects the user from the cloud service, as described in further detail hereinabove.

Thus, in one example, the receiving 240 of the determined first user-permission policy comprises effecting a change in authorizations of the logged-in user in the cloud service, using an application programming interface (API) that is run on the computer of the cloud service, as described in further detail hereinabove.

In a second example, the determined user-permission policy is rather communicated to one of the cloud service's computers, say as data that is stored in a file received 240 on the cloud service's computer, as an email attachment, using FTP (File Transfer Protocol), etc., as described in further detail hereinabove.

When the file is received 240 by the cloud service (say by the policy receiver 640), data received 240 in the file, is used by the cloud service as a basis for changing the user's authorizations, say using a routine run every two minutes on the cloud service's computer, say using scheduling software, as known in the art.

Optionally, later, data on occurrence of a later event (say the user's repeated attempt to delete user permission data) that occurs after the cloud service (say the policy receiver 640) receives 240 the first user-permission policy, is also sent from the cloud service to the authentication service (say by the user data communicator 630), as described in further detail hereinabove.

In one example, the data on the later event is retrieved and sent using an API the queries a log of the cloud service for one or more events, as predefined by a programmer when using the API in computer code used to implement the cloud service, the authentication service, or both, as described in further detail hereinbelow.

Upon receiving the data on the later event, the authentication service communicates again with the logged-in user's client device, for receiving a third authentication factor from the logged-in user, as described in further detail hereinabove.

Optionally, the third authentication factor is different from both the first and the second authentication factors received from the user.

In one example, the first authentication factor is the user's username or password, the second factor is the user's proven possession of a phone or other device listed on the authentication service as belonging to the user, and the third is a biometric one—say a template extracted from a scan of the user's fingerprint or face, as known in the art.

When in receipt of the third authentication factor, the authentication service determines if the third authentication factor is valid, as described in further detail hereinabove.

Based on a result of the determining of validity or lack of validity of the third authentication factor, the authentication service determines a second user-permission policy for the logged-in user, and sends the determined second user-permission policy to the cloud service, as described in further detail hereinabove.

Then, the second user-permission policy is received by the cloud service, say by the policy receiver 640 of system 6000, and the cloud service's usage is restricted based on the received second user-permission policy, say by the usage restrictor 650 of system 6000, as described in further detail hereinbelow.

Optionally and similarly, later on, there may be received a third, fourth, fifth, or higher, user permission policy for the logged-in user from the authentication service, say a policy determined by the authentication service based on occurrence of certain events, and based on different authentication factors, as described in further detail hereinabove.

Thus, with some exemplary embodiments, the user is authenticated in a multi-phase process, such that in each phase, the user is authenticated using another authentication factor. Thus, in one example, in one stage, the user is authenticated using a second authentication factor, in a another, subsequent phase, the user is authenticated using a third authentication factor, in yet another, subsequent phase, the user is authenticated by a fourth factor, etc.

Optionally, in each one of two or more phases of the multi-phase process, the usage of a cloud service by the user is limited according to a different user-permission policy.

Optionally, the user-permission policy for each one of the two or more phases is determined according to validity or lack of validity of a respective, different authentication factor, as described in further detail hereinabove.

Optionally, the second exemplary method further includes a preliminary step of receiving a preliminary user-permission policy from the authentication service, say by the policy receiver 640 of system 6000, as described in further detail hereinbelow.

The preliminary step further includes restricting usage of the cloud service by the logged-in 220 user based on the received preliminary user-permission policy, before receiving the first user-permission policy, say by the usage restrictor 650 of system 6000, as described in further detail hereinabove.

Thus, in one example, after communicating 230 the data that identifies the logged-in user to the authentication service, but before receiving 240 the first user-permission policy, the cloud service (say system 6000) receives a preliminary user-permission policy from the authentication service.

In the example, until receiving 240 the first user-permission policy, the usage of the cloud service by the logged-in 220 user is restricted (say by the usage restrictor 650 of system 6000) based on the received preliminary user-permission policy, as described in further detail hereinabove.

The preliminary user-permission policy is thus used by the cloud service as a basis for restricting the usage of the cloud service by the logged-in user on until the authentication service-determined first user-permission policy for the logged-in user, is received 240 by the cloud service, as described in further detail hereinabove.

Optionally, the preliminary user-permission policy is received by the cloud service using an API that effects a change in the user's authorizations on the cloud service, say using parameters input to the API by computer code that implements the authentication service or the cloud service, as described in further detail hereinabove.

Optionally, the preliminary user-permission policy is received by one of the cloud service's computers as data that is stored in a file transmitted to the cloud service's computer, say as an email attachment or using FTP, as described in further detail hereinabove.

Thus, in a first example, in a step preceding the preliminary step described hereinabove, an IT worker of the user's organization defines a preliminary user-permission policy to be applied on any user that belongs to the organization. The preliminary user-permission of the example policy may be, for example, a user-permission policy that restricts activities of any logged-in user not authenticated using a second authentication factor yet, to data reading only.

In the first example, the IT worker defines the preliminary user-permission policy using a GUI implemented on a webpage of the authentication service (say on a GUI with multiple input fields, menus, and other elements, as described in further detail hereinbelow).

In the first example, using the GUI, the IT worker further defines a list of cloud services that the preliminary user-permission policy is to be communicated to, as described in further detail hereinbelow.

In the first example, the preliminary user-permission policy is communicated to all cloud services included in the list defined by the organization's IT worker, periodically, say every day, every week, every two hours, etc., as defined by the IT worker, or rather by an operator or programmer of the authentication service.

Optionally, the preliminary user-permission policy is not communicated to the cloud services periodically, but is rather communicated to the cloud service after the user logs in to the cloud service successfully, as described in further detail hereinabove.

Thus, in some examples, the preliminary user-permission policy is communicated to the cloud service after the authentication service receives the data that identifies the logged-in user, but before the authentication service receives the second authentication factor, as described in further detail hereinabove.

Optionally, after receiving the preliminary user-permission policy, the usage of the cloud service by the logged-in user is restricted based on the preliminary user-permission policy, until there is received the first user-permission policy from the authentication service, as described in further detail hereinabove.

Figure 3:
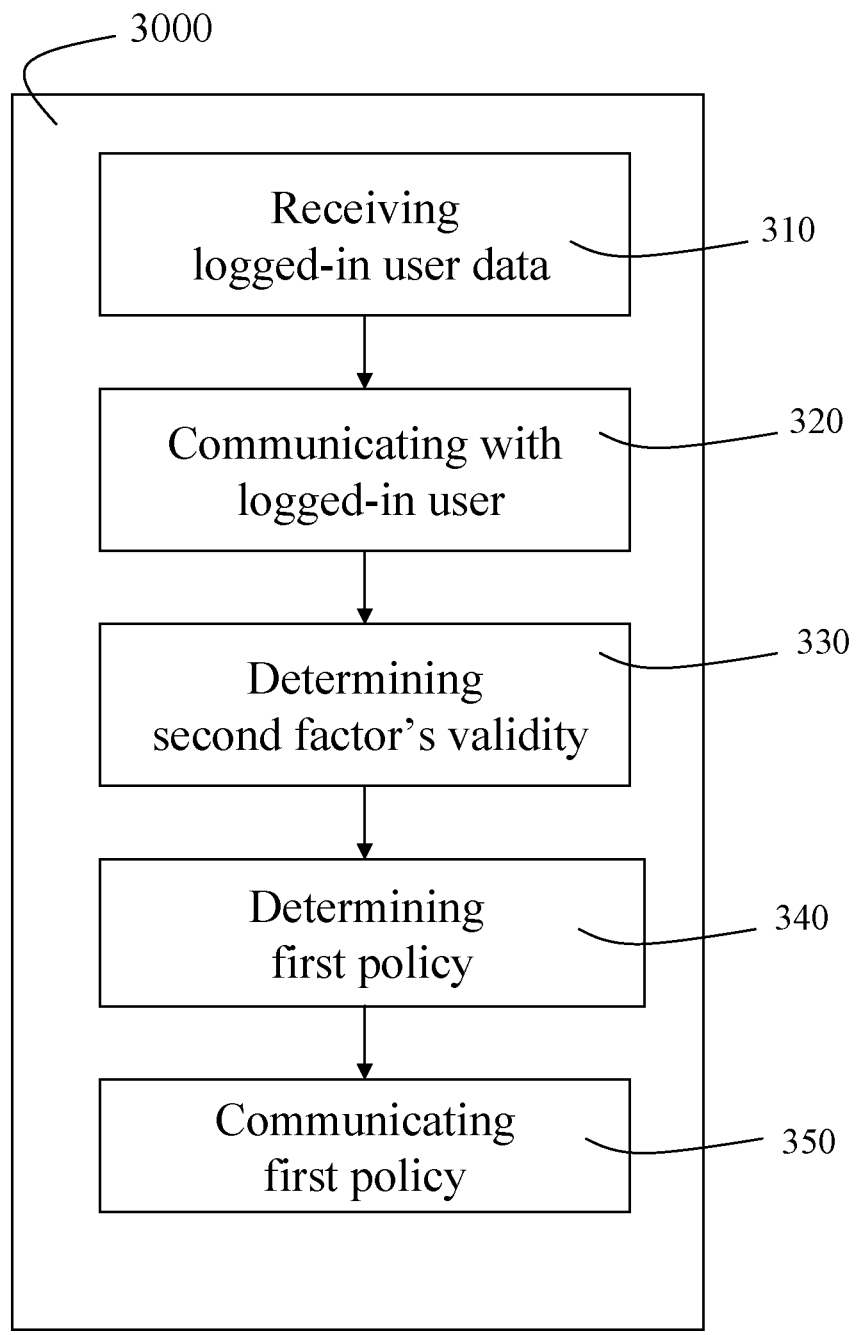
FIG. 3 is a simplified block diagram schematically illustrating a first non-transitory computer readable medium storing computer executable instructions for performing steps of multi-factor authentication, according to an exemplary embodiment of the present invention.

Reference is now made to FIG. 3 which is a simplified block diagram schematically illustrating a first non-transitory computer readable medium storing computer executable instructions for performing steps of multi-factor authentication, according to an exemplary embodiment of the present invention.

According to an exemplary embodiment of the present invention, there is provided a non-transitory computer readable medium 3000.

The medium 3000 may include, but is not limited to, a Micro SD (Secure Digital) Card, a CD-ROM, a USB-Memory, a Hard Disk Drive (HDD), a Solid State Drive (SSD), a computer's ROM chip, a DRAM (Dynamic Random Access Memory) or other RAM (Random Access Memory) component, a cache memory component of a computer processor, etc., or any combination thereof, as known in the art.

In one example, the computer readable medium 3000 is a part of a system used to implement the authentication service, say of system 5000, as described in further detail hereinbelow.

Optionally, the computer executable instructions are coded and stored on the medium 3000 by a programmer of the authentication service (say of system 5000), as described in further detail hereinabove.

The instructions may be executed on one or more computers, say by one or more processors of the computer(s) of system 5000 when used to implement at least a part of the authentication service, as described in further detail and illustrated using FIG. 5, hereinbelow.

The computer readable medium 3000 stores computer executable instructions, for performing steps of multi-factor authentication, according to an exemplary embodiment of the present invention, say according to steps of the first exemplary method used to implement an authentication service, as described in further detail and illustrated using FIG. 1, hereinabove.

Thus, the computer executable instructions include a step of receiving 310 from a computer of a cloud service (say from system 6000), data identifying a user logged-in to a cloud service, after the user is successfully authenticated using a first authentication factor, say by system 5000, as described in further detail hereinbelow.

In one example, the data that identifies the user successfully authenticated and logged-in to the cloud service, is generated by an API used by the authentication service to detect the user's logged-in event, and to receive 310 the data that identifies the logged-in user from the cloud service, as described in further detail hereinabove.

The example's API includes a subroutine used by the authentication service to retrieve 310 data on any user that when the API is run, is logged-in to the cloud service, provided that the user belongs to an organization signed up to the authentication service or is a worker of the authentication service.

Thus, in one example, the API includes a subroutine that queries one or more tables of active users of the cloud service, and their organizational data (say one or more related tables of a database of the cloud service), to retrieve usernames or other data that identify users successfully authenticated and logged-in.

The query used by the API that queries the active users table(s) may be defined in advance, say by a computer programmer of the authentication service, as described in further detail hereinabove.

In a second example, the API rather queries a log of the cloud service for log-in events that are predefined by the programmer of the authentication service, when using the API in computer code used to implement the authentication service, as described in further detail hereinabove.

In one example, the API subroutine is run automatically, say every two minutes, by the authentication service (say through remote access to the cloud service) or rather by the cloud service itself, say using scheduling software, as known in the art.

Optionally, for logging in to the cloud service, the user has to be successfully authenticated by the cloud service, using a first authentication factor (say a username, a password, an IP Address or any combination thereof), as described in further detail hereinabove. Alternatively or additionally, the user's authentication using the first authentication factor is rather carried out by the authentication service, as described in further detail hereinabove.

In another example, when a user logs in to the cloud service and is successfully authenticated using a first authentication factor (say a username, a password, an IP Address, or any combination thereof), the cloud service forwards login data on the user (say a username, organization, login time, IP Address, etc.) to the authentication service. The login data of the example make up at least a part of the data on the logged-in user that is received 310 by the authentication service, as described in further detail hereinabove.

Optionally, the computer executable instructions further include instructions with which, after receiving 310 the data that identifies the logged-in user, the user's details (say a phone number or an email address) are retrieved from a database of the authentication service.

The user's details may be input to the authentication's database in advance of receipt 310 of the data, say by an IT worker of the user's organization when setting up an account with the authentication service, say using a GUI implemented by instructions stored on the medium 3000, as described in further detail hereinabove.

The computer executable instructions stored on the medium 3000 further include a step of communicating 320 with a client device in use by the logged-in user, for receiving 320 a second authentication factor from the logged-in user, as described in further detail hereinabove.

Optionally, the authentication service communicates 320 with the client device while the user is already logged-in to the service (say after the user is successfully authenticated using the first authentication factor and is allowed into the cloud service) and can use the cloud service, at least partially, as described in further detail hereinbelow.

In one example, the specific user's device that the authentication service communicates with is not a device (say computer) in use by the user for accessing the cloud service or for providing the first authentication factor, but rather, another device (say a smart phone or another computer) identified as belonging to the user.

Thus, in the example, rather than interrupting the user's actions performed on the cloud service using a first client device, the authentication service communicates with a second client device that is known to belong to the user, for receiving the second authentication factor from the user, as described in further detail hereinbelow.

Optionally, the computer executable instructions further include instructions that allow an IT worker of the user's organization to record data that lists the specific user's client devices in a database of the authentication service, say when setting up an account with to the authentication service, as described in further detail hereinabove.

Optionally, the authentication service communicates 320 with the user's client device (say the user's smart phone)—whether used for accessing the cloud service or not—for receiving the second authentication factor from the logged-in user, without redirecting the user from a website used by the user to access the cloud service.

In one example, the authentication service communicates 120 with the user without redirecting a browser used by the user on his laptop computer (say from the cloud service's webpage to the authorization service's webpage) or requiring the user to interact with the authentication service on the authentication service's webpage.

Optionally, the second authentication factor is of a type that is different from the first authentication's, say a factor with which the user proves the user's possession of something (say of the user's smart phone), a factor based on biometric measurement of the user (say a scan of the user's fingerprint or face), etc., as known in the art.

Thus, optionally, in a first example, the user logs in to a cloud service using the user's laptop computer, by providing a first authentication factor (say the user's username, password, or both) that is verified by the cloud service, and used by the cloud service as a basis for allowing the user to log in to the cloud service.

Alternatively or additionally, the user's authentication using the first authentication factor is rather carried out by the authentication service, as described in further detail hereinabove. In the first example, a few seconds later, the user's log-in event is detected 310 by the authentication service using an API executed on the cloud service, the authentication service thereby receiving 310 the data that identifies the user logged-in to the cloud service after being successfully authenticated using the first factor.

In the first example, the authentication service authenticates the logged-in user while the user is active on the cloud service, using a second authentication factor with which the user proves that the user possess a client device recorded on a database of the authentication service, as a client device that belongs to the user.

For example, an organization may record phone numbers of the organization's employees in a database of the authentication service, to be used by the authentication service for verifying possession of a cellular phone that has that phone number, by a user, as described in further detail hereinabove.

Alternatively or additionally, the user's cellular phone is added to the database upon the user's being provided the client application from the authentication service directly or rather from the user's organization, as described in further detail hereinbelow.

Thus, in the example, after receipt 310 of the data, the authentication service (say the authentication factor communicator 520) retrieves 320 the user's cellular phone number from the database, and communicates 320 with the user's cellular phone, for receiving 320 the second authentication factor from the logged-in user, as described in further detail hereinabove.

In the first example, the authentication service's computer communicates 320 with the user logged-in to the cloud service with the user's laptop computer, by sending 320 a textual (say SMS) message to the user's cellular phone's number (say a "Logged in to Dropbox?" message), as described in further detail hereinabove.

In other examples, the authentication service authenticates the user using a different second authentication factor, say using an OTP (One-Time-Password) key generated by a client application installed on the user's cellular phone or by an OTP security dongle when connected by the user to the user's computer, using face recognition, using a fingerprint scan, etc., as described in further detail hereinabove.

Thus, in some examples, unlike the IdP services described hereinabove, the authentication service communicates 320 with the user in a way that does not involve web interaction and/or does not require redirection of the user's device used by the user to access the cloud service to a webpage of the authentication service, while the logged-in user can still act on the cloud service.

The computer executable instructions further include a step in which, after receiving 320 the second authentication factor, there is determined 330 whether the second authentication factor received 320 from the logged-in user, is valid, as described in further detail hereinabove.

The validity or lack of validity of the second authentication factor is determined 330 according to one or more criterions, as described in further detail hereinbelow.

In the first example above, the user provides 320 the second authentication factor, simply by replying positively (say with a textual message bearing the "Yes" text) to the message (say the "Logged in to Dropbox?" message) sent 320 to the user's cellular phone (i.e. the phone number), as described in further detail hereinabove.

Thus, in the first example, the user proves his possession of the cellular phone, merely by sending 320 the reply message from the user's cellular number as recorded in advanced on the authentication service's database, say using the client application or rather, using simple SMS, as described in further detail hereinabove.

More specifically, in the first example, the computer executable instructions verify 330 that the cellular number that the user's reply message is received 320 from is indeed, the user's number recorded on the authentication service's database. If the number is indeed the user's number recorded on the database, the computer executable instructions determine 330 that the second authentication factor is valid, thus authenticating 330 the logged-in user using a second authentication factor.

The criterions used by the computer executable instructions for determining 330 whether the second authentication factor received 320 from the user is valid, may additionally or alternatively, include one or more other criterions, as described in further detail hereinabove.

The computer executable instructions further include a step in which, based on a result of the determining 330 of the second authentication factor's validity or lack of validity, there is determined 340 a first user-permission policy for the logged-in user as described in further detail hereinabove.

Optionally, the first user-permission policy is determined 340 according to data on the user, data on the user's device, data on the cloud service, data on the a second authentication factor (say the second authentication factor's type, validity, or both), etc., or any combination thereof, as described in further detail hereinabove.

Optionally, the determining 340 of the first user-permission policy is carried out by selecting 340 the user-authentication policy among two or more policies that are predefined and recorded in a database of the authentication service in advance of the user's logging in to the cloud service, as described in further detail hereinabove.

Optionally, the policies recorded on the database are defined and recorded in the authentication service's database, in advance of any authentication of a user who is an employee of the organization by the authentication service, say using a GUI implemented by instructions stored on the medium 3000.

Optionally, the policies are defined by a programmer or operator of the authentication service, by an IT worker of the user's organization, etc., say using a GUI implemented on a website of the authentication service, as described in further detail hereinabove.

In a first example, one or more of the policies is defined by a programmer of the authentication service, say as a set of parameters input to an API subroutine or otherwise embedded in the subroutine's computer code. In the first example, when executed on the cloud service, the API effects a change in the user's authorizations on the cloud service, as described in further detail hereinbelow.

In a second example, one or more of the policies is defined as data stored on a database of the cloud service. When received by the cloud service, say in a file sent 350 to the computer of the cloud service over a wide area network such as the internet. The received data is used by the cloud service as a basis for changing the user's authorizations, as described in further detail hereinabove.

In one example, a first one of two or more of the predefined policies pertains to a case in which the second authentication factor is determined 340 to be valid, whereas a second one of the two or more predetermined policies pertains to a case in which the second authentication factor is not determined 340 to be valid.

Specifically, in the example, the first predefined policy is selected 340 for the logged-in user, if the user-provided 320 second authentication factor is determined 330 to be valid. More specifically, in the example, the second authentication factor is determined 330 to be valid if the user's "Yes" message is received 320 within five minutes of the sending 320 of the "Logged in to Dropbox?" message to the user, as described in further detail hereinabove.

In the example, the first predefined policy allows the logged-in user to read, update and delete any data stored by the user's organization on the cloud service (i.e. any data stored on the cloud service by the user or by another user that belongs to the user's organization).

Further in the example, if the user's "Yes" message is not received 320 within five minutes of the sending of the "Logged in to Dropbox?" message to the user, the second authentication factor is not determined 330 to be valid. Consequently, there is selected 340 the second predefined policy for the logged-in user.

In one example, the second predefined policy limits the user's activities to reading data records created by the user himself only. In a second example, the second predefined policy blocks the logged-in user from acting on the cloud service and disconnects the logged-in user from the cloud service.

The computer executable instructions further include a step in which the first user-permission policy is communicated 350 to a computer of the cloud service, for the cloud service to base a restriction of usage of the cloud service by the logged-in user on, as described in further detail hereinabove.

In one example, the first user-permission policy is communicated 350 to the cloud service, using an API that effects a change in the user's authorizations on the cloud service and/or disconnects the user from the cloud service, say as parameters input to a subroutine of the API or embedded in the API's code, as described in further detail hereinabove.

Thus, in one example, the communicating 350 of the determined 340 first user-permission policy comprises effecting a change in authorizations of the logged-in user in the cloud service, using an application programming interface (API) that is run on the computer of the cloud service, as described in further detail hereinabove.

In a second example, the determined 340 user-permission policy is rather communicated 350 to one of the cloud service's computers as data that is stored in a file transmitted 350 to the cloud service's computer, say as an email attachment or using FTP (File Transfer Protocol), etc.

When the file is received by the cloud service, the data received in the file, is used by the cloud service as a basis for changing the user's authorizations, say using a utility program run every two minutes on the cloud service's computer, say using scheduling software, as known in the art.

Optionally, the computer executable instructions further include a later step, in which later step, there is received data on occurrence of a later event (say an attempt of the user to access data of an organization other than the user's organization), which event occurs after the user's authentication using the second authentication factor.

In one example, the data on the later event is received using an API that periodically queries a log of the cloud service for one or more events that are predefined by a programmer of the authentication service, say when using the API in computer code used to implement the authentication service.

The computer executable instructions further include a step in which, upon receiving the data on the later event, the logged-in user's client device is communicated again, for receiving a third authentication factor from the logged-in user, as described in further detail hereinabove.

Optionally, the third authentication factor is different from both the first and the second authentication factors received from the user.

Thus, in one example, the first authentication factor is the user's username or password, the second authentication factor is a proven possession of the user's cellular phone or other device, and the third authentication factor is biometric—say a template extracted from scanning the user's fingerprint, retina, or face, as known in the art.

The computer executable instructions further include a step in which, after the third authentication factor is received, there is determined if the third authentication factor is valid, as described in further detail hereinabove.

The computer executable instructions further include a step in which, there is determined a second user-permission policy for the logged-in user based on a result of the determining of the validity or lack of validity of the third authentication factor, as described in further detail hereinabove.

The computer executable instructions further include a step in which, the determined second user-permission policy is communicated to the computer of the cloud service, for the cloud service to base a restriction of the logged-in user's on the cloud service on, as described in further detail hereinabove.

Optionally and similarly, later on, the computer executable instructions further include steps in which there is determined a third, fourth, fifth, or higher, user permission policy for the logged-in user, say upon receipt of data on occurrence of certain events, as described in further detail hereinbelow.

Thus, with some exemplary embodiments, the user is authenticated in a multi-phase process, such that in each phase, the user is authenticated using another authentication factor, as described in further detail hereinabove.

Optionally, with the computer executable instructions stored on the medium 3000, in each one of two or more phases of the multi-phase process, the usage of a cloud service by the user is limited according to a different user-permission policy. In one example, the user-permission policy for each phase is determined according to validity or lack of validity of a respective, different authentication factor, as described in further detail hereinabove.

Optionally, the computer executable instructions further include a preliminary phase that includes a step in which a preliminary user-permission policy is communicated to the computer of the cloud service, for the cloud service to base a restriction of usage of the cloud service by the user on, before receiving the first user-permission policy.

The preliminary user-permission policy is thus used by the authentication service as a basis for restricting the usage of the cloud service by the logged-in user on until the authentication service determines the first user-permission policy for the logged-in user, as described in further detail hereinabove.

Optionally, the preliminary user-permission policy is communicated to the cloud service using an API that effects a change in the user's authorizations on the cloud service, say using parameters input to the API by computer code that implements the authentication service, as described in further detail hereinabove.

Optionally, the preliminary user-permission policy is rather communicated to one of the cloud service's computers as data that is stored in a file that is transmitted to the cloud service's computer, say as an email attachment or using FTP, as described in further detail hereinabove.

Thus, in a first example, in a step preceding the preliminary step described hereinabove, an IT worker of the user's organization defines a default, preliminary user-permission policy to be applied on any user that belongs to the organization. The preliminary user-permission policy may be, for example, a user-permission policy that restricts activities of any logged-in user not authenticated using a second authentication factor yet, to data reading only.

In the first example, the IT worker defines the policy using a GUI implemented on a webpage of the authentication service (say a GUI with multiple input fields, menus, etc., and/or other elements, as known in the art), as described in further detail hereinabove.

In the first example, using the GUI, the IT worker further defines a list of cloud services that the preliminary user-permission policy is to be communicated to, as described in further detail hereinabove.

Optionally, the computer executable instructions further include a step in which, the preliminary user-permission policy is communicated to all cloud services included in the list defined by the organization's IT worker, periodically, say every day, every week, every two hours, etc., as defined by the IT worker, or rather by an operator or programmer of the authentication service.

Optionally, the computer executable instructions rather include a step in which, the preliminary user-permission policy is communicated to a cloud service after the user logs in to the cloud service successfully using a first authentication factor (say the user's username, password, or both).

Thus, in some examples, after receiving 310 the data that identifies the logged-in user, but prior to communicating 320 with the logged-in user for receiving the second authentication factor, the preliminary user-permission policy is communicated to the cloud service's computer, as described in further detail hereinabove.

Consequently, the cloud service restricts usage of the cloud service by the logged-in user based on the preliminary authentication policy, until the cloud service receives the first user-permission policy from the authentication service.

Optionally, the computer executable instructions further allow an organization to limit remote access of users to cloud services based on a criterion that is based on one or more parameters. The criterion is used for determining 340 the first user-permission policy, for determining the preliminary user-permission policy, etc., as described in further detail hereinbelow.

Accordingly, the computer executable instructions may further include a step of receiving auxiliary data.

The computer executable instructions may further include instructions that use at least a part of the auxiliary data, together with the data received 310 on the logged-in user who is authenticated using the first authentication factor, and the result of step 330, for determining 340 the first user-permission policy for the logged-in user, as described in further detail hereinbelow.

Optionally, at least a part of the auxiliary data is received from the cloud service's computer, whether periodically—say every three hours, once a day, etc., or rather in real time or near real time—say a few seconds after the user logs in to the cloud service, say in the step of receiving 310 the data on the logged-in user.

Optionally, at least a part of the auxiliary data is received from the user's organization, say using a GUI implemented on a website that the authentication service uses for allowing IT workers of organizations that subscribe to the authentication service, to input the auxiliary data or a part thereof.

Optionally, at least a part of the auxiliary data is received from the user, say using a GUI implemented on a website that the authentication service uses for allowing users of organizations that subscribe to the authentication service, to input the auxiliary data or a part thereof.

Optionally, the computer executable instructions may further include using at least a part of the auxiliary data for the determining 340 of the preliminary user-permission policy, the first user-permission policy, the second or higher user-permission policy, or any combination thereof, as described in further detail hereinabove.

Optionally, the auxiliary data includes data on the client device (laptop, smart cellular phone, etc.) used to access the cloud service.

The data on the client device used to access the cloud service, may include, for example, an indication on the client device's type (say a laptop computer vs. a cellular phone), on the device's prior use by the user (say when logging in to the cloud service before), on the device's configuration, etc., as described in further detail hereinabove.

The data on the device's configuration may include, for example, a list of applications installed on the client device, data on statuses of applications installed on the client device (say that a specific application used for encrypting files on the client device is stopped or removed), etc., as described in further detail hereinabove.

The data on the client device used to access the cloud service may additionally or alternatively, include a security indication, say an indication that a certain anti-virus is installed on the device or that the client device belongs to the user's organization (and is thus, presumably, more trustworthy than a private device), etc.

Optionally, the auxiliary data includes data on the logged-in user, say on the user's organizational role, department, current geographical location (say GPS location data), IP (Internet Protocol) Address, recent behavior (say an indication that the user attempts to access data that does not belong to the user's organization), etc.

Optionally, the auxiliary data includes data on a network (say the internet or a cellular network) used by the user for logging in to the cloud service, say an SSID (Service Set Identifier) of an access point (say of a Wi-Fi network) that the user uses to access the cloud service, a security method of the access point (say WEP, WPA2, WPA3, etc.), etc., as known in the art.

The data on the network may additionally or alternatively, include, data that lists one or more access points revealed in a scan carried out by the client device when communicating with the cloud service, data that marks one or more of access points as malicious, etc., as described in further detail hereinabove.

Optionally, the auxiliary data includes data on the cloud service, say data that identifies the cloud service, data that identifies an owner or operator of the cloud service, etc., as described in further detail hereinbelow.

The data on the cloud service may additionally or alternatively include, status data (say that the service is under hackers attack or is slower than usual), configuration data (say on a vulnerable program used by the service), user-specific configuration data (say that a specific user connected to the service can access all documents on the service), etc., as described in further detail hereinabove.

Optionally, the computer executable instructions further include a step in which, the auxiliary is stored in a database that is also referred to hereinbelow as a context database.

Each one of context database's records holds a specific combination of the auxiliary data, say of specific user, device, network and service attributes, thus defining a specific user's circumstance under which the device, network and service is used by the specific user, as described in further detail hereinbelow.

Optionally, the determining 340 of the first user-permission policy, the determining of the preliminary user-permission, the determining of the later determined user-permission policy, or any combination thereof, is based on one or more of the records of the context database, as described in further detail hereinabove.

Optionally, the computer executable instructions further include a step in which there is received one or more rules from the user's organization, say from an IT (Information Technology) worker of the user's organization, as described in further detail hereinbelow.

The one or more rules are used for determining one or more of the user-permission policies, say for determining 340 the first user-permission or for determining the preliminary user-permission policy, say together with one or more of the records stored in the context database, as described in further detail hereinabove.

Thus, in one example, when defining the preliminary user-permission policy, the first user-permission policy, or one of the other user-permission policies, an IT worker of an organization may be allowed to define one or more rules that are saved in a database, on the authentication service's computer, as described in further detail hereinabove.

Optionally, the rule defined when defining the preliminary user-permission policy, first user-permission policy, or another one of the policies described hereinabove, dictates the user's circumstances under which the user-permission policy being defined is to be selected for the user, as described in further detail hereinbelow.

In the example, the determining 340 of the first user-permission policy, the determining of the preliminary user-permission, the determining of the later user-permission policy, or any combination thereof, may additionally or alternatively, be based on one or more of the rules received from the organization, as described in further detail hereinabove.

Figure 4:
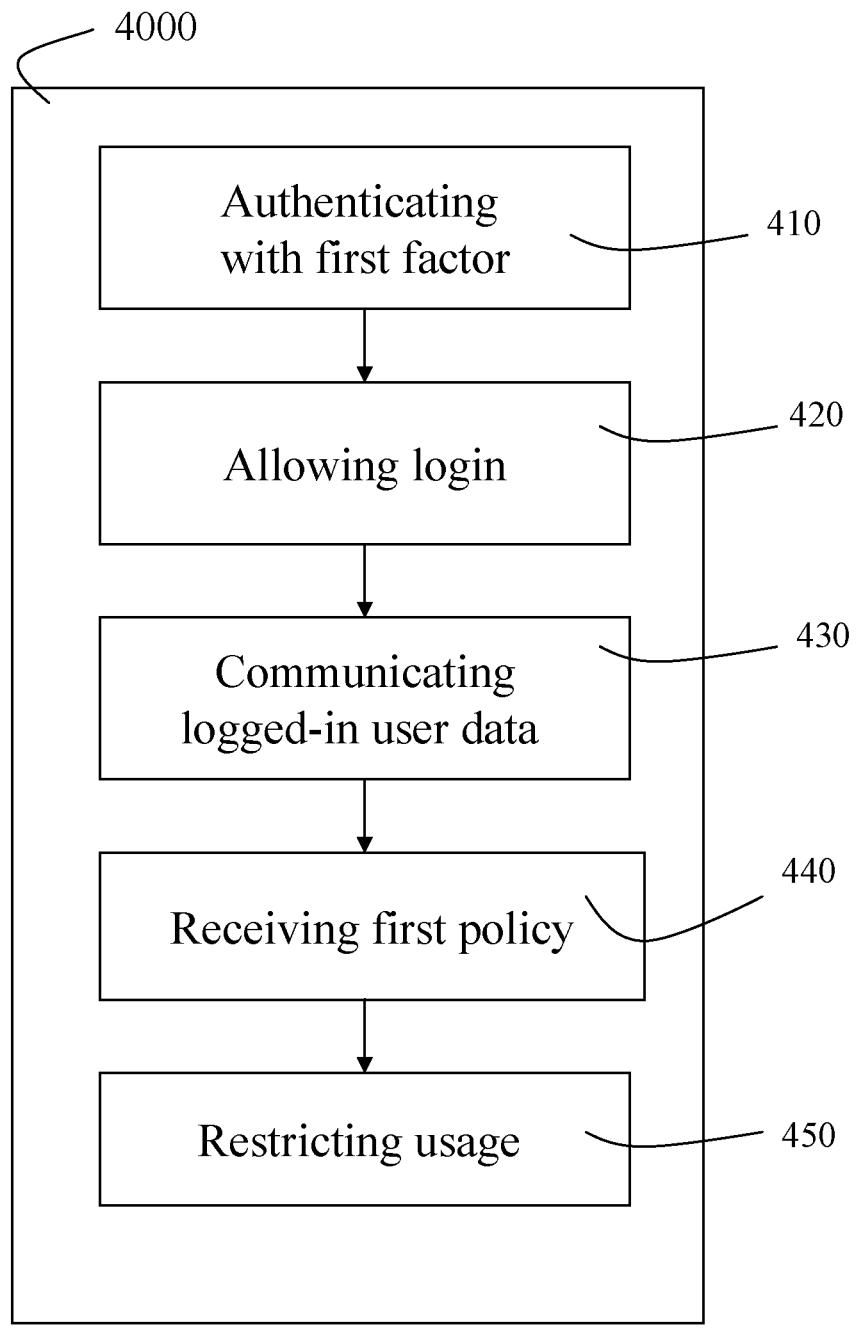
FIG. 4 is a simplified block diagram schematically illustrating a second non-transitory computer readable medium storing computer executable instructions for performing steps of multi-factor authentication, according to an exemplary embodiment of the present invention.

Reference is now made to FIG. 4 which is a simplified block diagram schematically illustrating a second non-transitory computer readable medium storing computer executable instructions for performing steps of multi-factor authentication, according to an exemplary embodiment of the present invention.

According to an exemplary embodiment of the present invention, there is provided a second non-transitory computer readable medium 4000.

The medium 4000 may include, but is not limited to, a Micro SD (Secure Digital) Card, a CD-ROM, a USB-Memory, a Hard Disk Drive (HDD), a Solid State Drive (SSD), a computer's ROM chip, a DRAM (Dynamic Random Access Memory) or other RAM (Random Access Memory) component, a cache memory component of a computer processor, etc., or any combination thereof, as known in the art.

In one example, the computer readable medium 4000 is a part of a system used to implement at least a part of a cloud service that users of one or more organization that are clients of the authentication service use, say as a part of system 6000, as described in further detail hereinbelow.

Optionally, the computer executable instructions are coded and stored on the medium 4000 by a programmer of the cloud service, as described in further detail hereinabove.

The instructions may be executed on one or more computers, say by one or more processors of the computer(s) of system 6000 used to implement at least a part of the cloud service, as described in further detail and illustrated using FIG. 6, hereinbelow.

The computer readable medium 4000 stores computer executable instructions, for performing steps of multi-factor authentication, say according to steps of the second exemplary method used to implement a cloud service, as described in further detail and illustrated using FIG. 2, hereinabove.

In the second exemplary method of multi-factor authentication, a user who wishes to use a cloud service, accesses the cloud service, say by opening a webpage of the cloud service, as known in the art.

The user attempts to log in to the cloud service using a first authentication factor, say by typing a username, password, or both, on the cloud service's webpage, as described in further detail hereinabove.

The computer executed instructions stored on the medium 4000 include a step of authenticating 410 the user that attempts to log in to the cloud service, using the first authentication factor, say using the user's username, password, IP address, etc., or any combination thereof, as described in further detail hereinbelow.

The computer executed instructions stored on the medium 4000 include a step of authenticating 410 the user, say by comparing a first authentication factor (say a username or a password) received from the user to a reference value (say the user's username or password), as described in further detail hereinabove.

Optionally, the reference value is provided earlier to a computer of the cloud service, say when opening the user's account with the cloud service (whether by the user himself or rather, by the user's organization), and stored in one of the cloud service's databases, as described in further detail hereinabove.

Additionally or alternatively, the authentication of the user using the first authentication factor is rather carried out by the authentication service, as described in further detail hereinabove.

The computer executed instructions stored on the medium 4000 further include a step in which, if the first authentication factor provided by the user is found to be valid—the user thus being successfully authenticated 410 using the first factor—the authenticated 410 user is allowed 420 to log-in to the cloud service, as described in further detail hereinbelow.

The computer executed instructions stored on the medium 4000 further include a step in which, after the user logs in 420 to the cloud service and is authenticated 410 successfully, there is communicated 430 data that identifies the logged-in user to a computer of the authentication service, as described in further detail hereinabove.

In one example, the data that identifies the user successfully authenticated 410 and logged-in 420 to the cloud service, is generated and communicated 430 to the cloud service using an API (Application Programming Interface) that is exposed by the cloud service, as described in further detail hereinabove.

The API (whether run by the cloud service or rather, by the authentication service) is thus used by the cloud service to detect the user's logged-in event, and to send 430 the data that identifies the logged-in user from the cloud service's computer to the authentication service's computer, as described in further detail hereinabove.

The API of the example includes a subroutine that generates the data on the logged-in user, by retrieving data on any user that when the API is run, is logged-in to the cloud service, provided that the user belongs to an organization signed up to the authentication service or is the authentication service's worker.

Thus, in one example, the API includes a subroutine that generates the data by querying a database of active users of the cloud service and their organizational data (say one or more related tables of a database of the cloud service), to retrieve usernames or other data that identify users successfully authenticated and logged-in.

In a second example, the API's subroutine rather generates the data that identifies the user successfully authenticated 410 and logged-in to the cloud service, by querying a log of the cloud service for log-in events, as described in further detail hereinabove.

In one example, the API that generates the data that identifies the user successfully authenticated 410 and logged-in to the cloud service, is run automatically, say every two minutes, by the authentication service (say through remote access to the cloud service) or rather by the cloud service itself.

After receiving the data on the logged-in user from the cloud service, the user authentication service attempts to authenticate the user, using a second authentication factor provided by the user to the authentication service, as described in further detail hereinabove.

Optionally, the second authentication factor is of a type that is different from the first authentication factor's.

Thus, in one example, the first authentication factor provided by the user is a password, whereas the second authentication factor provided by the user is a factor with which the user proves his possession of something (say a smart phone), a factor based on a biometric measurement of the user (say a scan of the user's face), etc., as described in further detail hereinabove.

Based on a result of a determining of the second authentication factor's validity or lack of validity, the authentication factor determines a first user-permission policy for the logged-in user, and communicates the first user-permission policy to the cloud service, as described in further detail hereinabove.

Optionally, the authentication service determines the first user-permission policy according to data on the user, data on the user's device, data on the cloud service, data on the type of authentication factor used as a second authentication factor, etc., or any combination thereof, as described in further detail hereinbelow.

The computer executable instructions further include a step in which the first user-permission policy determined by the authentication service is received 440 by the cloud service, as described in further detail hereinabove.

The computer executable instructions stored on the medium 4000 further include a step of restricting 450 the cloud service's use by the logged-in user based on the received 440 first user-permission policy, as described in further detail hereinbelow.

In one example, the first user-permission policy is received 440 by the cloud service using an API that effects a change in the user's authorizations on the cloud service and/or disconnects the user from the cloud service, as described in further detail hereinabove.

Thus, in one example, the receiving 440 of the determined first user-permission policy comprises effecting a change in authorizations of the logged-in user in the cloud service, using an application programming interface (API) that is run on the computer of the cloud service, as described in further detail hereinabove.

In a second example, the determined user-permission policy is rather communicated to one of the cloud service's computers, say as data that is stored in a file received 440 on the cloud service's computer, say as an email attachment, using FTP (File Transfer Protocol), etc., as described in further detail hereinabove.

When the file is received 440 by the cloud service, data received 440 in the file, is used by the cloud service as a basis for changing the user's authorizations, say using a routine run every two minutes on the cloud service's computer, say using scheduling software, as described in further detail hereinabove.

Optionally, the computer executable instructions further include a step in which, data on occurrence of a later event (say an attempt of the user to access data of an organization other than the user's) that occurs after the cloud service receives 440 the first user-permission policy, is also sent to the authentication service, as described in further detail hereinabove.

In one example, the data on the later event is retrieved and sent using an API the queries a log of the cloud service for one or more events, as predefined by a programmer when using the API in computer code used to implement the authentication service, the cloud service, or both, as described in further detail hereinabove.

Upon receiving the data on the later event, the authentication service communicates again with the logged-in user's client device, for receiving a third authentication factor from the logged-in user, as described in further detail hereinabove.

Optionally, the third authentication factor is different from both the first and the second authentication factors received from the user, as described in further detail hereinabove.

Optionally, after receiving the third authentication factor, the authentication service determines if the third authentication factor is valid, selects a second user-permission policy for the logged-in user based on a result of the determining of the validity or lack thereof, and sends the second user-permission policy to the cloud service, as described in further detail hereinabove.

Accordingly, the computer executable instructions stored on the medium 4000 may further include a step in which the second user-permission policy is received by the cloud service, and a step in which the cloud service's usage is restricted based on the received second user-permission policy, as described in further detail hereinabove.

Optionally and similarly, later on, there may be received a third, fourth, fifth, or higher, user permission policy for the logged-in user from the authentication service, say a policy determined by the authentication service based on occurrence of certain events, and based on different authentication factors, as described in further detail hereinabove.

Thus, with some exemplary embodiments, the user is authenticated in a multi-phase process, such that in each phase, the user is authenticated using another authentication factor. Thus, in one example, in one stage, the user is authenticated using a second authentication factor, in a another, subsequent phase, the user is authenticated using a third authentication factor, in yet another, subsequent phase, the user is authenticated by a fourth factor, etc.

Optionally, in each one of two or more phases of the multi-phase process, the usage of a cloud service by the user is limited by one or more of the computer executable instructions, according to a different user-permission policy, as described in further detail hereinabove.

Optionally, the user-permission policy for each one of the two or more phases is determined according to validity or lack of validity of a respective, different authentication factor, as described in further detail hereinabove.

Optionally, the computer executable instructions stored on the medium 4000 further includes a preliminary phase that includes a step of receiving a preliminary user-permission policy from the authentication service, as described in further detail hereinabove.

The preliminary phase further includes a step of restricting usage of the cloud service by the logged-in user based on the received preliminary user-permission policy, before receiving the first user-permission policy, as described in further detail hereinabove.

Thus, in one example, after communicating 430 the data that identifies the logged-in user to the authentication service, but before receiving 440 the first user-permission policy, there is received a preliminary user-permission policy from the authentication service. Then, the usage of the cloud service by the logged-in user is restricted based on the received preliminary user-permission policy, as described in further detail hereinabove.

The preliminary user-permission policy is thus used by the cloud service as a basis for restricting the usage of the cloud service by the logged-in user on until the authentication service determined first user-permission policy for the logged-in user, is received 440 by the cloud service, as described in further detail hereinabove.

Optionally, the preliminary user-permission policy is received using an API that effects a change in the user's authorizations on the cloud service, say using parameters input to the API by computer code that implements the authentication service or the cloud service, as described in further detail hereinabove.

Optionally, the preliminary user-permission policy is received by one of the cloud service's computers as data that is stored in a file transmitted to the cloud service's computer, say as an email attachment or using FTP, as described in further detail hereinabove.

Thus, in a first example, in a step of the computer executable instructions, which step precedes the preliminary step described hereinabove, an IT worker of the user's organization is allowed to define a preliminary user-permission policy to be applied on any user that belongs to the organization. The preliminary user-permission of the example policy may be, for example, a user-permission policy that restricts activities of any logged-in user not authenticated using a second authentication factor yet, to data reading only.

In the first example, the IT worker defines the preliminary user-permission policy using a GUI implemented by some of the computer executable instructions on a webpage of the authentication service (say on a GUI with multiple input fields, menus, and other elements, as known in the art).

In the first example, using the GUI, the IT worker further defines a list of cloud services that the preliminary user-permission policy is to be communicated to, as described in further detail hereinabove.

In the first example, the preliminary user-permission policy is communicated to all cloud services included in the list defined by the organization's IT worker, periodically, say every day, every week, every two hours, etc., as defined by the IT worker, or rather by an operator or programmer of the authentication service.

Optionally, the preliminary user-permission policy is not communicated to the cloud services periodically, but is rather sent to the cloud service after the user logs in to the cloud service successfully using the first authentication factor (say password), and the data on the logged-in user is received by the authentication service, as described in further detail hereinabove.

Thus, in some examples, the preliminary user-permission policy is communicated to the cloud service after the authentication service receives the data that identifies the logged-in user, but before the authentication service receives the second authentication factor, as described in further detail hereinabove.

After receiving the preliminary user-permission policy, the usage of the cloud service by the logged-in user is restricted based on the preliminary authentication policy, until there is received 440 the first user-permission policy from the authentication service, as described in further detail hereinabove.

Figure 5:
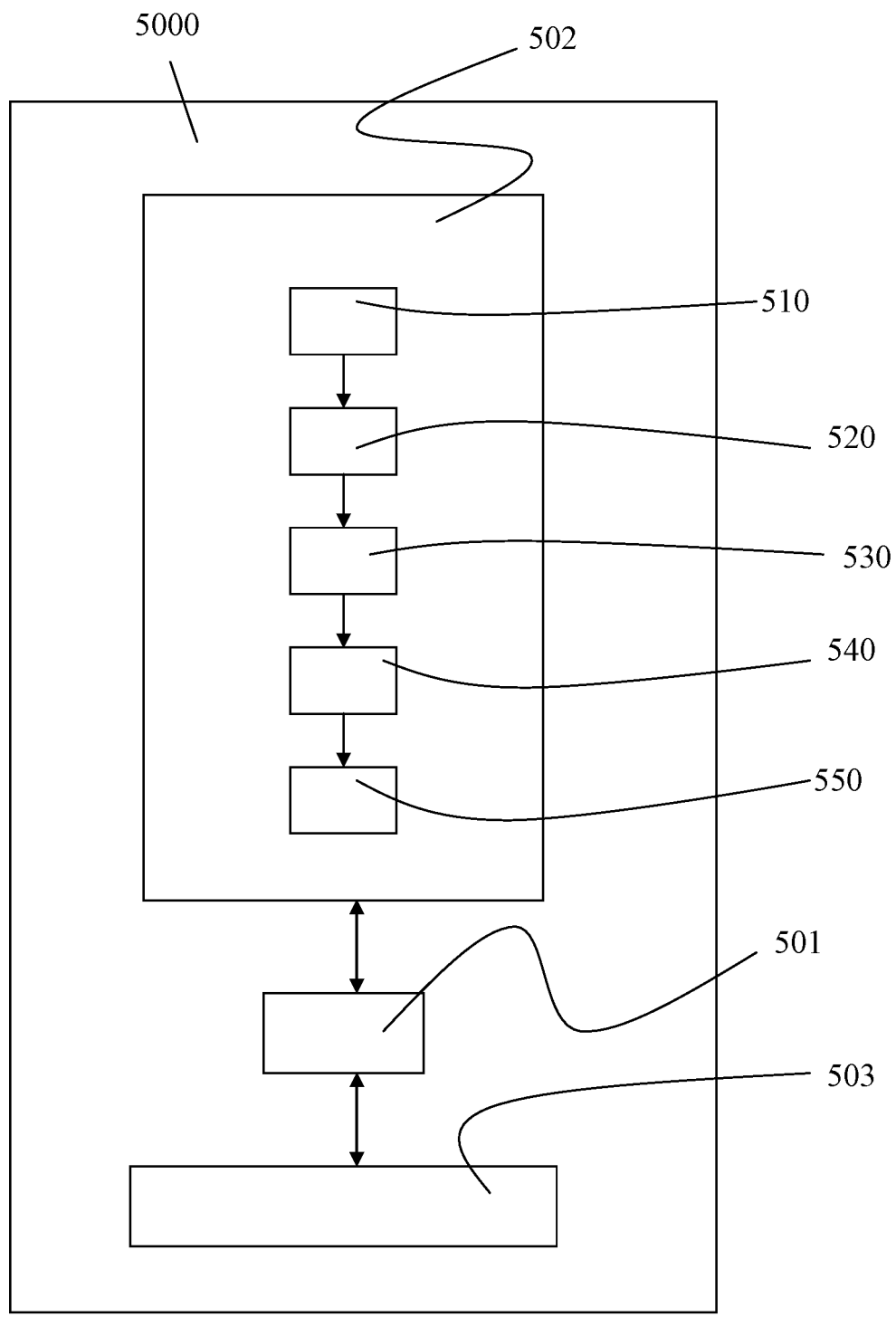
FIG. 5 is a simplified block diagram schematically illustrating a first exemplary system for multi-factor authentication, according to an exemplary embodiment of the present invention.

Reference is now made to FIG. 5, which is a simplified block diagram schematically illustrating a first exemplary system for multi-factor authentication, according to an exemplary embodiment of the present invention.

A system 5000 for multi-factor authentication, according to an exemplary embodiment of the present invention may be implemented using electric circuits, computer software, computer hardware, etc., or any combination thereof.

Thus, optionally, the system 5000 includes one or more circuits that comprise at least one computer processor 501 and at least one computer memory 502, say a circuit of one computer or circuits of two or more computers.

The one, two or more computers are used for implementing at least a part of the authentication service, as described in further detail hereinabove.

The computer memory 502 may include, but is not limited to: a Hard Disk Drive, a Solid State Drive, a computer's ROM chip, a DRAM component or another RAM component, a cache memory component of the computer processor 501, etc., or any combination thereof, say medium 3000 described in further detail hereinabove.

Optionally, the system 5000 further includes one or more communication cards 503, used for communicating with a user's client device, with a computer of the cloud service, etc., over the internet, over a cellular telephony network, over another communications network, etc., as described in further detail hereinabove.

The at least one computer memory 502 stores instructions that are executable by the at least one computer processor 501, for performing the steps of the first exemplary method, as described in further detail and illustrated using FIG. 1 hereinabove.

In an exemplary embodiment, the computer processor 501 is programmed to perform the instructions, and thereby to implement the system's 5000 one or more additional parts, say the parts 510-550 shown in FIG. 5, as described in further detail hereinbelow.

Each one of the additional parts may thus be implemented as software—say by programming the computer processor(s) 501 to execute one or more of the steps of the first exemplary method described in further detail hereinabove, as hardware—say as one or more hardware part of the electric circuit(s) that implement(s) at least a part of that first exemplary method, etc., any combination thereof.

Accordingly, the system 5000 includes a data receiver 510.

Optionally, the data receiver 510 uses one of the communication cards 503, for communicating with one or more computers that the cloud service is implemented on, as described in further detail hereinbelow.

After the user of a cloud service logs in to the cloud service and is successfully authenticated using a first authentication factor, the data receiver 510 receives data that identifies the user that is logged-in and successfully authenticated by the cloud service, from the cloud service's computer, as described in further detail and illustrated using FIG. 1, hereinabove.

In one example, the data that identifies the user successfully authenticated and logged-in to the cloud service, is generated and provided to the system 5000 by an API, say by an API that queries a log or table of the cloud service for login events or for active users, as described in further detail hereinabove.

The first exemplary system 5000 further includes an authentication factor communicator 520, in communication with the data receiver 510, with one or more of the communication cards 503, or with both.

The authentication factor communicator 520 communicates with a client device of the logged-in user, for receiving a second authentication factor from the logged-in user, as described in further detail hereinabove.

The authentication factor communicator 520 communicates with the client device of the logged-in user while the user is already logged into the service (i.e. after the user is successfully authenticated using the first authentication factor and is allowed to access the cloud service). While being communicated by the authentication factor communicator 520, the user can already use the cloud service, at least partially, as described in further detail hereinabove.

In one example, the specific user's device that the authentication service communicates with is not a device (say computer) in use by the user for accessing the cloud service or for providing the first authentication factor, but rather, another device (say a smart phone or another computer) identified as belonging to the user.

Thus, in the example, rather than interrupting the user's actions performed on the cloud service using a first client device, the authentication factor communicator 520 communicates with a second client device that is known to belong to the user, for receiving the second authentication factor, as described in further detail hereinabove.

Optionally, the authentication factor communicator 520 communicates with the user's client device (say smart phone)—whether used for accessing the cloud service or not—for receiving the second authentication factor from the logged-in user, without redirecting the user from the cloud service's website used by the user to access the cloud service.

Thus, in one example, the authentication factor communicator 520 communicates with the user without redirecting a browser used by the user on his laptop computer (say from the cloud service's webpage to the authorization service's webpage) or requiring the user to use the authentication service's webpage.

Optionally, the second authentication factor is of a type that is different from the first factor, say a factor with which the user proves the user's possession of something (say of the user's phone), a factor based on biometric measurement of the user (say a scan of the user's face), etc., as described in further detail hereinabove.

The first exemplary system 5000 further includes a validity determiner 530, in communication with the authentication factor communicator 520.

The validity determiner 530 determines whether the second authentication factor received by the authentication factor communicator 520 is valid, according to one or more criterions, as described in further detail hereinabove.

The first exemplary system 5000 further includes a policy determiner 540, in communication with the validity determiner 530.

The policy determiner 540 determines a first user-permission policy for the logged-in user, as described in further detail hereinabove.

Optionally, the policy determiner 540 determines the first user-permission policy according to data on the user, data on a network or device used by the user for accessing the cloud service, data on the cloud service, data on the type, validity or lack of validity of the second authentication factor, etc., as described in further detail hereinbelow.

Optionally, the policy determiner 540 determines the first user-permission policy by selecting the user-authentication policy among two or more policies that are predefined and recorded in one of the authentication service's databases in advance of the user's logging in to the cloud service, as described in further detail hereinabove.

The first exemplary system 5000 further includes a policy communicator 550, in communication with the policy determiner 540, with one or more of the communication cards 503, or with both.

The policy communicator 550 communicates the first user-permission policy determined by the policy determiner 540 to a computer of the cloud service, for the cloud service to base a restriction of usage of the cloud service by the logged-in user on, as described in further detail hereinabove.

In one example, the policy communicator 550 communicates the first user-permission policy to the cloud service, using an API that effects a change in the user's authorizations on the cloud service and/or disconnects the user from the cloud service, say as parameters input to a subroutine of the API or embedded in the API's code.

Thus, in one example, the communicating of the determined first user-permission policy comprises effecting a change in authorizations of the logged-in user in the cloud service, using an application programming interface (API) that is run on the computer of the cloud service, as described in further detail hereinabove.

In a second example, the policy communicator 550 rather communicates the determined user-permission policy to one of the cloud service's computers, as data that is stored in a file transmitted by the policy communicator 550 to the cloud service's computer, say as an email attachment or using FTP.

When the file is received by the cloud service (say by system 6000 described in hereinbelow), the data received in the file, is used by the cloud service, to base a changing of the user's authorizations on the cloud service on, say using a utility program run every minute on the cloud service, by a scheduling computer program.

Optionally, later, data on occurrence of a later event (say an attempt of the user to access data of an organization other than the user's), which event occurs after the user's authentication using the second authentication factor, is similarly received by the data receiver 510, as described in further detail hereinabove.

In one example, the data receiver 510 receives the data on the later event, using an API that periodically queries a log of the cloud service for one or more events that are predefined by a programmer of the authentication service, say when using the API in computer code used to implement the authentication service.

After the data on the later event is received by the data receiver 510, the authentication factor communicator 520 communicates again with the logged-in user's client device, this time, for receiving a third authentication factor from the logged-in user, as described in further detail hereinabove.

Optionally, the third authentication factor is different from both the first and the second authentication factors received from the user, as described in further detail hereinabove.

Thus, in one example, the first authentication factor is the user's username or password, the second factor is a proven possession of the user's cellular phone or other device, and the third factor is biometric—say a template extracted from scanning the user's fingerprint, retina, or face, as described in further detail hereinabove.

When the system 5000 is in receipt of the third authentication factor, the validity determiner 530 determines if the third authentication factor is valid, say in one or more of the ways described in further detail hereinabove.

Then, the policy determiner 540 determines a second user-permission policy for the logged-in user based on a result of the determining of the validity or lack of validity of the third authentication factor, say in one or more of the ways described in further detail hereinabove.

Next, the policy communicator 550 communicates the determined second user-permission policy to a computer of the cloud service, for the cloud service to base a restriction of the logged-in user's on the cloud service on, as described in further detail hereinabove.

Optionally and similarly, later on, there may be determined a third, fourth, fifth, or higher, user permission policy for the logged-in user, say upon receipt of data on occurrence of certain events, as predefined by a user or operator of the system 5000. Optionally, the third, fourth, fifth or higher policy is determined based on different authentication factors, as described in further detail hereinabove.

Thus, with some exemplary embodiments, the user is authenticated in a multi-phase process, such that in each phase, the user is authenticated using another authentication factor, as described in further detail hereinabove.

Optionally, in each one of two or more phases of the multi-phase process, the usage of a cloud service by the user is limited according to a different user-permission policy. In one example, in each specific one of the phases, the policy determiner 540 determines a user-permission policy for the specific phase, according to validity or lack of validity of a respective, different authentication factor, as described in further detail hereinabove.

Optionally, in a preliminary step, the policy communicator 550 communicates a preliminary user-permission policy to the computer of the cloud service, for the cloud service to base a restriction of usage of the cloud service by the user on, before the data receiver receives the first user-permission policy, as described in further detail hereinabove.

The preliminary user-permission policy is thus used by the system 5000 that implements the authentication service, as a basis for restricting usage of the cloud service by the logged-in user on, until communicating the first user-permission policy to the logged-in user, as described in further detail hereinabove.

Optionally, using the authentication service implemented by the system 5000, an organization can limit remote access of users to cloud services based on a criterion that is based on one or more parameters. The criterion is used by the system's 5000 policy determiner 540, for determining the first user-permission policy, for determining the preliminary user-permission policy, etc., as described in further detail hereinabove.

Optionally, the data receiver 510 further receives auxiliary data, whether from the cloud service, the logged-in user, the user's organization, or any combination thereof, as described in further detail hereinabove.

The auxiliary data may include, for example, data on a client device used to access the cloud service, data on the logged-in user, data on a network used by the user for logging in to the cloud service, data on the cloud service, data on a type of an authentication factor, etc., as described in further detail hereinabove.

Optionally, the system 5000 further includes a context database, and the data receiver 510 stores combinations of concurrent values of the auxiliary data's values in the context database. Each record of the context database defines a combination of auxiliary data values that together, define a circumstance of the logged-in user, as described in further detail hereinbelow.

Thus, each one of context database's records holds a specific combination of the auxiliary data, say of a specific user, device, network and service attributes, thus defining a specific circumstance under which the device, network and service is used by the specific user, as described in further detail hereinbelow.

Optionally, the policy determiner 540 uses the auxiliary data and the data received on the logged-in user authenticated using the first authentication factor, for determining a user-permission policy (whether the preliminary, first, or a later user-permission policy) for the logged-in user, as described in further detail hereinabove.

Optionally, the determining the first user-permission policy, the determining of the preliminary user-permission, the determining of the later determined user-permission policy, or any combination thereof, is based on one or more of the records of the context database, as described in further detail hereinbelow.

Optionally, the system 5000 further includes a policy definer (not shown), in communication with one or more of the communication cards 503.

The policy definer is operable by an IT worker of an organization, an administrator of system 5000 or another user if authorized to define policies, to define and record one or more of the policies in a database of the system 5000, in advance of the authentication service's authenticating users that belong to the organization.

Optionally, the policies are rather defined by a programmer or operator of the authentication service (say of system 5000), by an IT worker of the user's organization, etc., say using a GUI implemented on a website of the authentication service, as described in further detail hereinabove.

Optionally, the policy definer is further operable for receiving one or more rules (say from the organization's IT worker, using the GUI), and stores the rules in the policy database.

Optionally, the policy determiner 540 uses the stored rules for determining one or more of the user-permission policies, say for determining the first user-permission or the preliminary user-permission policy, say together with one or more the records stored in the context database, as described in further detail hereinabove.

Figure 6:
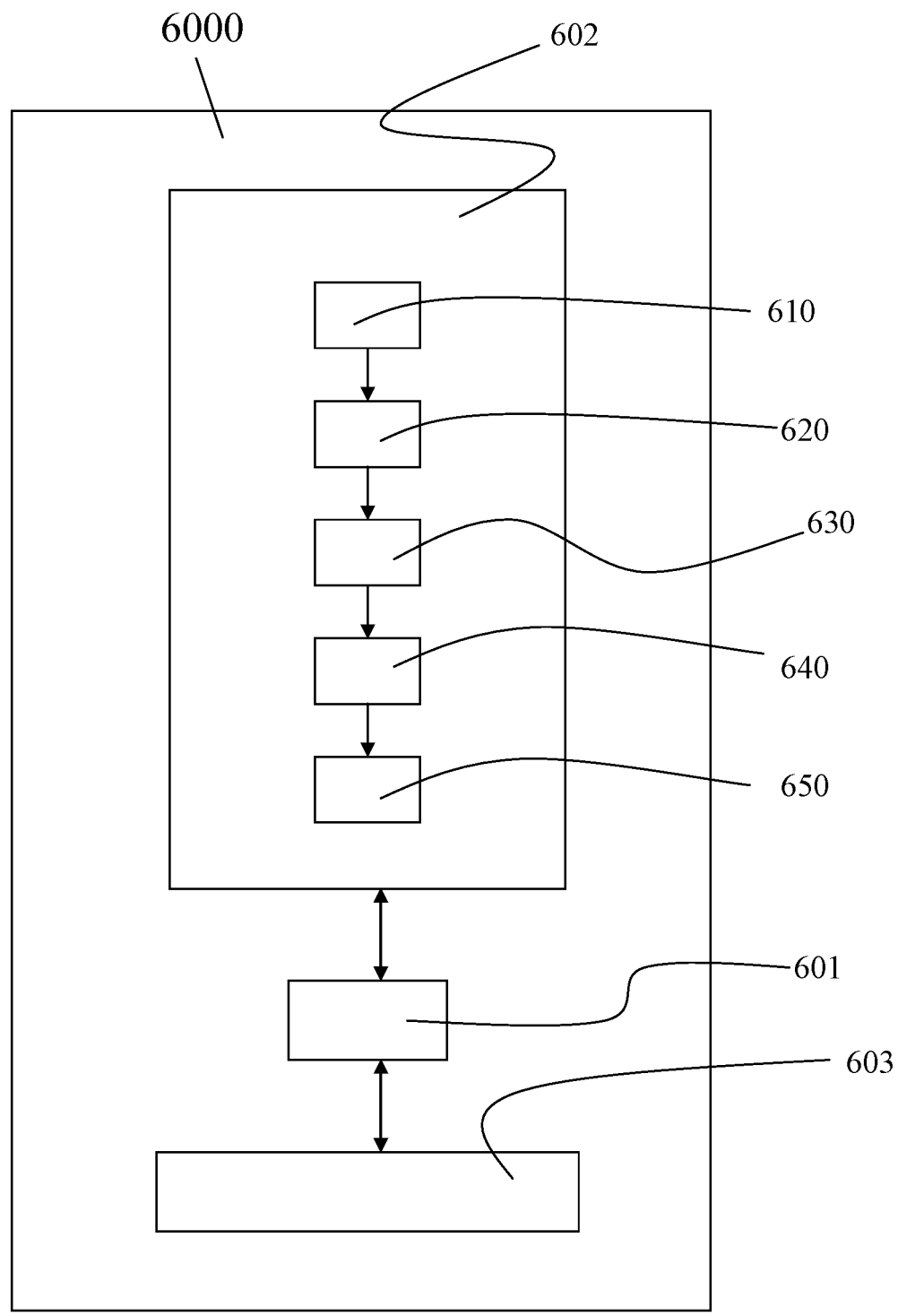
FIG. 6 is a simplified block diagram schematically illustrating a second exemplary system for multi-factor authentication, according to an exemplary embodiment of the present invention.

Reference is now made to FIG. 6, which is a simplified block diagram schematically illustrating a second exemplary system for multi-factor authentication, according to an exemplary embodiment of the present invention.

A system 6000 for multi-factor authentication, according to an exemplary embodiment of the present invention may be implemented using electric circuits, computer software, computer hardware, etc., or any combination thereof.

Thus, optionally, the system 6000 includes one or more circuits that comprise at least one computer processor 601 and at least one computer memory 602, say a circuit of one computer or circuits of two or more computers.

The one, two or more computers are used for implementing at least a part of a cloud service, as described in further detail hereinabove.

The computer memory 602 may include, but is not limited to: a Hard Disk Drive, a Solid State Drive, a computer's ROM chip, a DRAM component or another RAM component, a cache memory component of the computer processor 601, etc., or any combination thereof, say medium 4000 described in further detail hereinabove.

Optionally, the system 6000 further includes one or more communication cards 603, used for communicating with a user's client device over a cellular telephony or another network, with a computer of the authentication service over the internet or another network, etc., as described in further detail hereinabove.

The one or more computer memories 602 store instructions that are executable by the one or more computer processors 601, for performing the steps of the second exemplary method, as described in further detail and illustrated using FIG. 2 hereinabove.

In an exemplary embodiment, the computer processor 601 is programmed to perform the instructions, and thereby to implement the system's 6000 one or more additional parts, say the parts 610-650 shown in FIG. 6, as described in further detail hereinbelow.

Each one of the additional parts may thus be implemented as software—say by programming the computer processor(s) 601 to execute one or more of the steps of the second exemplary method described in further detail hereinabove, as hardware—say as one or more hardware part of the electric circuit(s) that implement(s) at least a part of that second exemplary method, etc., any combination thereof.

The system 6000 may implement the second exemplary method as a multi-phased multi-factor process of authenticating a user who wishes to login to, and use a cloud service, as described in further detail hereinbelow.

The cloud service may include, but is not limited to, a shared IT service such as MS Office 365™, Dropbox™, or another IT resource that is made available to users on demand, usually via the internet or via another wide area network, and that is shared among the cloud service provider's client organizations, as known in the art.

Thus, every day, such a cloud service usually serves users of several organizations that access the cloud service over the internet or over another wide area network.

The cloud service may additionally or alternatively, include a specific organization's own database, information system or software development tool, etc., or any combination thereof, as known in the art.

For carrying out the steps of the second exemplary method, the system 6000 communicates with a user of the cloud service and with an authentication service that the first exemplary method is carried out by, etc., say using one or more communication cards 603, as described in further detail hereinabove.

In a first example, the authentication service is implemented by a party other than the user, the user's organization (say employer) and the cloud service (whether the cloud service is operated by a party other than the user's organization or not).

In the first example, the authentication service is thus provided to the user's organization as an outsourced service of authenticating the organization's users when using the cloud service, and optionally, to one or more other organizations that are authentication service's clients, as described in further detail hereinabove.

For each specific one of the client organizations, the user authentication service provides the user authentication service with respect to one or more different cloud services. Each one of the cloud service provides users (say employees) of the specific organization with access to one or more shared computing resources, as described in further detail hereinabove.

In the example, the system's 6000 communication card(s) 603 may remotely communicate with a client device used by the user for accessing the cloud service, with the authentication service, with a CASB service that monitors communication between the user and the cloud service, etc., as described in further detail and hereinabove.

In a second example, the authentication service is rather implemented by the user's organization itself. For example, the authentication service may be implemented on one or more of the organization's own server computers, as described in further detail hereinabove.

In the second exemplary method of multi-factor authentication, a user who wishes to use a cloud service, accesses the cloud service, say by opening a webpage of the cloud service, as known in the art.

Then, the user attempts to log in to the cloud service using a first authentication factor, say by typing a username and a password on the cloud service's webpage, as described in further detail hereinabove.

The second exemplary system 6000 that performs the steps of the secondary exemplary method includes a user authenticator 610.

Optionally, the user authenticator 610 uses one or more of the communication cards 603, for communicating with the client device used by the user for attempting to access the cloud service, as described in further detail hereinabove.

The user authenticator 610 authenticates the user that attempts to access the cloud service, using the first authentication factor.

In a first example, the user authenticator 610 authenticates the user by comparing the first authentication factor (say username, password, or both) to a reference value (say the username or the password) provided earlier to the system 6000 by the user himself or rather, by the user's organization, and stored in a database, as described in further detail hereinabove.

The second exemplary system 6000 further includes a login controller 620, in communication with the user authenticator 610.

If the user authenticator 610 finds the first authentication factor provided by the user to be valid, the user thereby being successfully authenticated by the user authenticator 610, the login controller 620 allows the authenticated user to log-in to the cloud service and use the cloud service, as described in further detail hereinabove.

The second exemplary system 6000 further includes a user data communicator 630, in communication with the login controller 620, with the one or more communication cards 603, or both.

After the user logs in to the cloud service and is successfully authenticated by the user authenticator 610 using the first authentication factor, the user data communicator 630 communicates data that identifies the logged-in user to a computer of an authentication service, as described in further detail hereinabove In one example, the user data communicator 630 generates and communicates the data that identifies the user successfully authenticated and logged-in to the cloud service, to the authentication service, using an API (Application Programming Interface), as described in further detail hereinabove.

The API (whether run by the cloud service or rather, by the authentication service) is thus used by the user data communicator 630 to detect the user's logged-in event, and send the data that identifies the logged-in user to the authentication service's computer, as described in further detail hereinabove.

After receiving the data on the logged-in user, the user authentication service attempts to authenticate the user, using a second authentication factor provided by the user to the authentication service, say using an authentication factor of a type that is different from the first authentication factor's, as described in further detail hereinabove.

The system further includes a policy receiver 640, in communication with the user data communicator 630. The policy receiver 640 also communicates with the authentication service (say with system 5000), say using one of the communication cards 603, as described in further detail hereinabove.

Based on a result of the determining of the second authentication factor's validity or lack of validity, the authentication service determines a first user-permission policy for the logged-in user, and communicates the first user-permission policy for the policy receiver 640 to receive, as described in further detail hereinabove.

Optionally, the authentication service determines the first user-permission policy according auxiliary data that may be generated, at least in part, on the cloud service and sent to the authentication service, say by the data communicator 630, as described in further detail hereinbelow.

Additionally or alternatively, the authentication service may use auxiliary data that the authentication service receives from the user's organization, from the user, etc., for determining the first user-permission policy for the logged-in user, as described in further detail hereinabove.

The auxiliary data may include data on the user, data on the user's device, data on the cloud service, data on the type or validity of the second authentication factor, etc., or any combination thereof, as described in further detail hereinabove.

The second exemplary system 6000 further includes a usage restrictor 650, in communication with the policy receiver 640.

After the policy receiver 640 receives the first user-permission from a computer of the authentication service, the usage restrictor 650 restricts the cloud service's usage by the logged in user based on the first user-permission policy, as described in further detail hereinabove.

In one example, policy receiver 640 receives the first user-permission policy, using an API that effects a change in the user's authorizations on the cloud service and/or disconnects the user from the cloud service, as described in further detail hereinabove.

Thus, in one example, the receiving of the first user-permission policy by the policy receiver 640 includes effecting a change in authorizations of the logged-in user on the cloud service, using an application programming interface (API) that is run on the computer of the cloud service, as described in further detail hereinabove.

In a second example, the user-permission policy is rather communicated to the policy receiver 640, as data that is stored in a file received, say as an email message attachment, using FTP (File Transfer Protocol), etc., as described in further detail hereinabove.

When the file is received by the policy receiver 640, the data received in the file, is used by the cloud service as a basis for changing the user's authorizations, say using a routine run every two minutes on the cloud service's computer, as described in further detail hereinabove.

Optionally, later, data on occurrence of a later event (say the user's attempt to access data of an organization other than his) that occurs after the policy receiver 640 receives the first user-permission policy, is also sent by the user data communicator 630 to the authentication service, as described in further detail hereinabove.

Upon receiving the data on the later event, the authentication service communicates again with the logged-in user's client device, for receiving a third authentication factor from the logged-in user, as described in further detail hereinabove.

Optionally, the third authentication factor is different from both the first and the second authentication factors received from the user, as described in further detail hereinabove.

When in receipt of the third authentication factor, the authentication service determines if the third authentication factor is valid, and based on a result of the determining of validity or lack of validity of the third authentication factor, determines a second user-permission policy for the logged-in user.

Then, the second user-permission policy is sent by the authentication service, received by the policy receiver 640, and used by the usage restrictor 650, to restrict the cloud service's usage by the logged-in user based on the received second user-permission policy, as described in further detail hereinabove.

Optionally and similarly, later on, the policy receiver 640 may receive a third, fourth, fifth, or higher, user permission policy for the logged-in user from the authentication service, as described in further detail hereinabove.

The preliminary, first, second, or higher user-permission policy may be determined by the authentication service using auxiliary data, rules, etc., received from the cloud service (say from the user data communicator 630), the user, the user's organization, etc., as described in further detail hereinabove.

Optionally, in a preliminary step of the second exemplary method, the policy receiver 640 receives a preliminary user-permission policy from the authentication service, say from system 5000, as described in further detail hereinabove.

The preliminary step further includes the usage restrictor's 650 restricting usage of the cloud service by the logged-in user based on the received preliminary user-permission policy, before the policy receiver 640 receives the first user-permission policy from system 5000, as described in further detail hereinabove.

Thus, in one example, after the user data communicator 630 communicates the data that identifies the logged-in user to the authentication service, but before the policy receiver 640 receives the first user-permission policy, the policy receiver 640 receives a preliminary user-permission policy from the authentication service. Then, the usage restrictor 650 restricts usage of the cloud service by the logged-in user based on the received preliminary user-permission policy, as described in further detail hereinabove.

The preliminary user-permission policy is used by the usage restrictor 650 as a basis for restricting the usage of the cloud service by the logged-in user on, until the authentication service determined first user-permission policy is received by the policy receiver 640, as described in further detail hereinabove.

Figure 7:
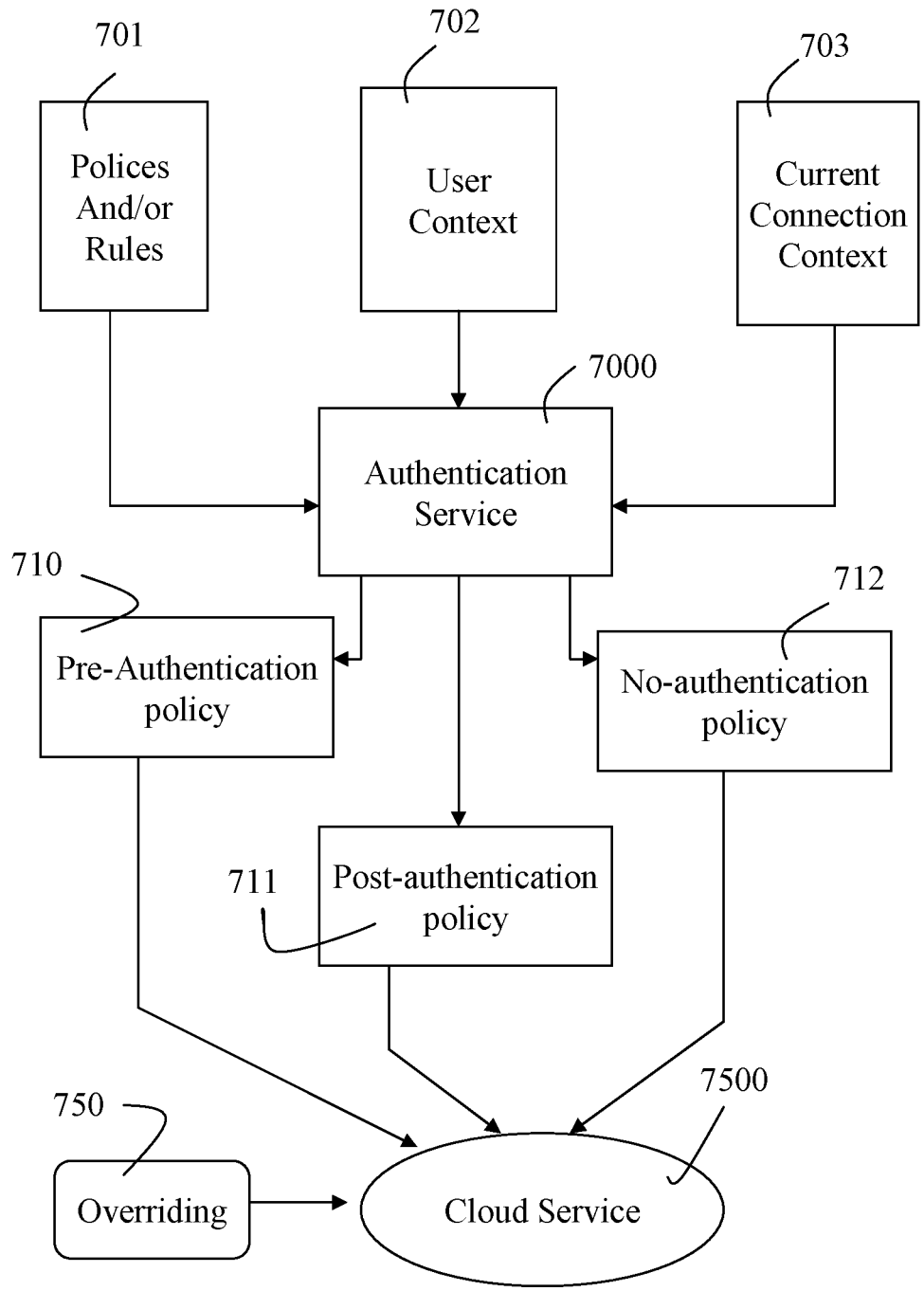
FIG. 7 is a simplified block diagram schematically illustrating an exemplary implementation scenario of multi-factor authentication, according to an exemplary embodiment of the present invention.

Reference is now made to FIG. 7 which is a simplified block diagram schematically illustrating an exemplary implementation scenario of multi-factor authentication, according to an exemplary embodiment of the present invention.

In one exemplary scenario, according to an exemplary embodiment of the present invention, the authentication service 7000 (say the data receiver 510 of system 5000) receives rules 701, policy data 701, auxiliary data 702-703, etc., or any combination thereof, from one or more sources, as described in further detail hereinabove.

The sources may include, for example, the user (whether when logged-in to the cloud service 7500, or earlier), the cloud service 7500, the user's organization, etc., as described in further detail hereinabove.

The policy data 701 may include, for example, data that defines the user-permission policies and is embedded in computer code of the authentication service by a programmer, say as parameters of an API subroutine that effects a change in authorizations of the logged-in user on the cloud service 7500, as described in further detail hereinabove.

The policy data 701 may additionally or alternatively include data input by a client organization of the authentication service, say by an IT worker of an organization that subscribes to the authentication service. The IT worker may input the data that defines one more user-permission policies, for example, using a GUI implemented on a webpage of the authentication service, as described in further detail hereinabove.

Optionally, at least a part of the policy data 701—whether input by the client organization, coded by the programmer, or input to the authentication service in another way or by another party, is stored in a database of the authentication service, say in a relational database.

The rules 701—whether input by the client organization, coded by the programmer, or input to the authentication service in another way or by another party, are also stored in a database of the authentication service.

The rules 701 define the circumstances under which a specific one of the policies defined by the policy data and stored in the authentication service's database, is to be selected (and thus determined) by the authentication service 7000 (say by the policy determiner 540 of system 5000), as described in further detail hereinbelow.

Optionally, the auxiliary data 702-703 is saved in a context database that is implemented as one or more records of a relational database, stored on a computer of the authentication service. Optionally, each one of the records of the context database represents a specific circumstance of a user, as a combination of values that are simultaneously in effect, as described in further detail hereinbelow.

More specifically, the auxiliary data may include general context data on the user 702—say the user's organizational position or role, user group, recent user behavior (say the user's repeated attempt to access data that does not belong to the user's organization), etc., as described in further detail hereinabove.

The auxiliary data may also include connection-specific context data 703—say data on the user (say the user's current IP Address) or data on the cloud service 7500 that the user is logged-in to (say that the cloud service's 7500 name or owner), etc., as described in further detail hereinabove.

The connection-specific context data 703 may additionally or alternatively include data on a network used to access the cloud service (say an SSID or a security indication on the network), data on the client device used by the user for accessing the cloud service (say the device's type), etc., as described in further detail hereinabove.

Optionally, each record of the context database pertains to a specific user, and record for the specific user, auxiliary data values that indicate a most up-to-date circumstance that the user is in. For example, a specific record may indicate that a specific user uses his laptop (rather than desktop), that the user is not a manager, the SSID of a network used by the specific user for accessing the cloud service 7500, the cloud service 7500 that the specific user is logged to, etc.

Optionally, the authentication service 7000 (say the policy determiner 540), uses the rules 701, and at least a part of the auxiliary data 702-703, for determining the preliminary 710, first 711-712, second or higher user-permission policy for the logged-in to the cloud service 7500, as described in further detail hereinabove.

In a first example, one of the rules 701 dictates that before the user's second authentication factor is determined to be valid or not, when a certain combination of values of the data on the user, the network and the cloud service 7500 is present in the user's context database's record, a specific preliminary user-permission policy 710 is to be selected.

The specific preliminary user-permission policy 710 of the example restricts the user's activities to reading and editing data that belongs to the user's organization.

The specific preliminary policy 710 of the example, is selected when the user is using his laptop, the user uses an access point known to be safe (say when the access point is listed on a white list defined on the authentication service), and the cloud service 7500 is Dropbox™.

Further in the first example, another one of the rules 701 dictates that before the user's second authentication factor is found to be valid, when the user uses his tablet computer, the user uses an access point known to be safe, and the cloud service 7500 is a web hosting service, another specific preliminary user-permission policy is to be selected for the logged-in user. The other specific preliminary user-permission policy limits the user's actions to reading certain configuration data only.

Similarly, in the example, when the user's second authentication factor is determined to be valid, based on the context database's record that represents the user's combination of auxiliary data that is up-to-date when the factor's validity is determined, a specific first user-permission policy 711 is selected for the logged-in user. The specific first user-permission policy selected when the second user authentication factor is determined to be valid, allows the logged-in user to read and edit any data that belongs to the user or to the user's organization.

However, in the example, when the user's second authentication factor is determined to be invalid, based on the context database's record that represents the user's combination of auxiliary data that is up-to-date when the factor's validity is determined to be invalid, another specific first user-permission policy 712 is selected for the logged-in user. The other specific first user-permission policy blocks the user from doing anything on the cloud service 7500 and disconnects the user from the cloud service, as described in further detail hereinabove.

Optionally, any user-permission policy determined automatically by the policy determiner 540, can be overridden manually 750, say by a system administrator of the cloud service or by an IT worker of the user's organization, whether on the cloud service 7500 or rather, on the authentication service.

It is expected that during the life of this patent many relevant devices and systems will be developed and the scope of the terms herein, particularly of the terms "Computer", "Database", "Cloud service, "Smart Phone", "Cellular Phone" "Tablet", "Laptop", "Communication Card", "Processor", "Access Point", "Network", "CD-ROM", "USB Memory", "Hard Disk Drive (HDD)", "Solid State Drive (SSD)", "File", "Database" and "API (Application Programming Interface" is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method of multi-factor authentication, the method comprising computer executed steps, the steps comprising:
    from a computer of a cloud service, receiving data identifying a user logged-in to the cloud service after being successfully authenticated using a first authentication factor;
    communicating with a client device of the user identified by the received data, for receiving a second authentication factor from the user;
    determining whether the second authentication factor received from the user is valid;
    based on a result of said determining, determining a first user-permission policy for the user; and
    communicating the determined first user-permission policy to the computer of the cloud service, for the cloud service to base a restriction of usage of the cloud service by the user on, wherein said determining of the first user-permission policy comprises selecting the first user-permission policy among at least two predefined policies, and wherein a first one of the predefined policies pertains to the second authentication factor being determined to be valid and a second one of the predetermined policies pertains to the second authentication factor not being determined to be valid.

2. The method of claim 1, wherein said communicating of the determined first user-permission policy comprises effecting a change in authorizations of the user on the cloud service.

3. The method of claim 1, further comprising a preliminary step of communicating a preliminary user-permission policy to the computer of the cloud service, for the cloud service to base a restriction of usage of the cloud service by the user on before receiving the first user-permission policy.

4. The method of claim 1, further comprising: after said receiving of the data identifying the user, communicating a preliminary user-permission policy to the computer of the cloud service, for the cloud service to base a restriction of usage of the cloud service by the user on before receiving the first user-permission policy.

5. The method of claim 1, further comprising receiving data pertaining to the user, and using the received data pertaining to the user, for said determining of the first user-permission policy.

6. The method of claim 1, further comprising receiving behavioral data pertaining to the user, and using the received behavioral data pertaining to the user, for said determining of the first user-permission policy.

7. The method of claim 1, further comprising receiving data pertaining to a network used by the user, and using the received data pertaining to the network, for said determining of the first user-permission policy.

8. The method of claim 1, further comprising receiving data pertaining to a client device in use by the user for accessing the cloud service, and using the received data pertaining to the client device in use for accessing the cloud service, for said determining of the first user-permission policy.

9. The method of claim 1, further comprising receiving data pertaining to the cloud service, and using the received data pertaining to the cloud service for said determining of the first user-permission policy.

10. The method of claim 1, further comprising receiving at least one rule from an organization of the user and using the received at least one rule for said determining of the first user-permission policy.

11. The method of claim 1, further comprising:
communicating with the client device of the user, for receiving a third authentication factor from the user;
determining whether the third authentication factor received from the user is valid;
based on a result of said determining, determining a second user-permission policy for the user; and
communicating the determined second user-permission policy to the computer of the cloud service, for the cloud service to base a restriction of the usage of the cloud service by the user on.

12. A method of multi-factor authentication, the method comprising computer executed steps, the steps comprising:
authenticating a user attempting to log in to a cloud service, using a first authentication factor;
allowing the authenticated user to log in to the cloud service;
communicating data identifying the user to a computer of an authentication service;
receiving a first user-permission policy determined by the authentication service for the user based on a result of an attempt to authenticate the user using a second authentication factor, from the computer of the authentication service; and
restricting usage of the cloud service by the user based on the received first user-permission policy, wherein the first user-permission policy is determined by the authentication service by selecting the user-permission policy among at least two predefined policies, and wherein a first one of the predefined policies pertains to the second authentication factor being determined to be valid and a second one of the predetermined policies pertains to the second authentication factor not being determined to be valid.

13. The method of claim 12, further comprising a preliminary step of receiving a preliminary user-permission policy from the computer of the authentication service, and restricting usage of the cloud service by the user based on the received preliminary user-permission policy, before said receiving of the first user-permission policy.

14. The method of claim 12, further comprising:
after said communicating of the data identifying the user to the computer of the authentication service but before said receiving of the first user-permission policy, receiving a preliminary user-permission policy from the computer of the authentication service, and restricting usage of the cloud service by the user based on the received preliminary user-permission policy.

15. A non-transitory computer readable medium storing computer processor executable instructions for performing steps of multi-factor authentication by a computer, the steps comprising:
from a computer of a cloud service, receiving data identifying a user logged-in to the cloud service after being successfully authenticated using a first authentication factor;
communicating with a client device of the user identified by the received data, for receiving a second authentication factor from the user;
determining whether the second authentication factor received from the user is valid;
based on a result of said determining, determining a first user-permission policy for the user; and
communicating the determined first user-permission policy to the computer of the cloud service, for the cloud service to base a restriction of usage of the cloud service by the user on, wherein said determining of the first user-permission policy comprises selecting the first user-permission policy among at least two predefined policies, and wherein a first one of the predefined policies pertains to the second authentication factor being determined to be valid and a second one of the predetermined policies pertains to the second authentication factor not being determined to be valid.

16. The computer readable memory of claim 15, wherein the steps further comprise a preliminary step of communicating a preliminary user-permission policy to the computer of the cloud service, for the cloud service to base a restriction of usage of the cloud service by the user on before receiving the first user-permission policy.

17. The computer readable memory of claim 15, wherein the steps further comprise: after said receiving of the data identifying the user, communicating a preliminary user-permission policy to the computer of the cloud service, for the cloud service to base a restriction of usage of the cloud service by the user on before receiving the first user-permission policy.

18. A non-transitory computer readable medium storing computer processor executable instructions for performing steps of multi-factor authentication by a computer, the steps comprising:
authenticating a user attempting to log in to a cloud service, using a first authentication factor;
allowing the authenticated user to log in to the cloud service;
communicating data identifying the user to a computer of an authentication service;
receiving a first user-permission policy determined by the authentication service for the user based on a result of an attempt to authenticate the user using a second authentication factor, from the computer of the authentication service; and
restricting usage of the cloud service by the user based on the received first user-permission policy, wherein the first user-permission policy is determined by the authentication service by selecting the user-permission policy among at least two predefined policies, and wherein a first one of the predefined policies pertains to the second authentication factor being determined to be valid and a second one of the predetermined policies pertains to the second authentication factor not being determined to be valid.

19. The computer readable memory of claim 18, wherein the steps further comprise a preliminary step of receiving a preliminary user-permission policy from the computer of the authentication service, and restricting usage of the cloud service by the user based on the received preliminary user-permission policy, before said receiving of the first user-permission policy.

20. The computer readable memory of claim 18, wherein the steps further comprise:
   after said communicating of the data identifying the user to the computer of the authentication service but before said receiving of the first user-permission policy, receiving a preliminary user-permission policy from the computer of the authentication service, and restricting usage of the cloud service by the user based on the received preliminary user-permission policy.

21. A system for multi-factor authentication, the system comprising a circuit comprising a computer processor and a computer memory storing instructions that are executable by the computer processor, for performing steps of multi-factor authentication, the steps comprising:
   from a computer of a cloud service, receiving data identifying a user logged-in to the cloud service after being successfully authenticated using a first authentication factor;
   communicating with a client device of the user identified by the received data, for receiving a second authentication factor from the user;
   determining whether the second authentication factor received from the user is valid;
   based on a result of said determining, determining a first user-permission policy for the user; and
   communicating the determined first user-permission policy to the computer of the cloud service, for the cloud service to base a restriction of usage of the cloud service by the user on, wherein said determining of the first user-permission policy comprises selecting the first user-permission policy among at least two predefined policies, and wherein a first one of the predefined policies pertains to the second authentication factor being determined to be valid and a second one of the predetermined policies pertains to the second authentication factor not being determined to be valid.

22. A system for multi-factor authentication, the system comprising a circuit comprising a computer processor and a computer memory storing instructions that are executable by the computer processor, for performing steps of multi-factor authentication, the steps comprising:
   authenticating a user attempting to log in to a cloud service, using a first authentication factor;
   allowing the authenticated user to log-in to the cloud service;
   communicating data identifying the user to a computer of an authentication service;
   receiving a first user-permission policy determined by the authentication service for the logged-in user based on a result of an attempt to authenticate the user using a second authentication factor, from the computer of the authentication service; and
   restricting usage of the cloud service by the user based on the received first user-permission policy, wherein the first user-permission policy is determined by the authentication service by selecting the user-permission policy among at least two predefined policies, and wherein a first one of the predefined policies pertains to the second authentication factor being determined to be valid and a second one of the predetermined policies pertains to the second authentication factor not being determined to be valid.

* * * * *